(12) United States Patent
Kellock et al.

(10) Patent No.: US 8,249,426 B2
(45) Date of Patent: Aug. 21, 2012

(54) METHOD OF AUTOMATICALLY EDITING MEDIA RECORDINGS

(75) Inventors: Peter Rowan Kellock, Singapore (SG); Shri Venkata Radhakrishna Achanta, Singapore (SG); Gerald Thomas Beauregard, Singapore (SG); Sheng Lo, Singapore (SG); Philip Norman Morgan, Singapore (SG); Yee Cheng Ng, Singapore (SG); Srikumar Karaikudi Subramanian, Singapore (SG); Eu Gin Terence Swee, Singapore (SG); Emarson Victoria, Singapore (SG); Bin Rubani Mafrudy, Singapore (SG)

(73) Assignee: Muvee Technologies Pte Ltd, Singapore (SG)

( * ) Notice: Subject to any disclaimer, the term of this patent is extended or adjusted under 35 U.S.C. 154(b) by 1401 days.

(21) Appl. No.: 11/721,459

(22) PCT Filed: Dec. 13, 2004

(86) PCT No.: PCT/SG2004/000409
§ 371 (c)(1), (2), (4) Date: Jun. 12, 2007

(87) PCT Pub. No.: WO2006/065223
PCT Pub. Date: Jun. 22, 2006

(65) Prior Publication Data
US 2008/0101762 A1    May 1, 2008

(51) Int. Cl.
*G11B 27/00* (2006.01)
*H04N 5/93* (2006.01)

(52) U.S. Cl. .................. 386/278; 386/241; 386/E5.001
(58) Field of Classification Search .................. 386/241, 386/278, E5.001
See application file for complete search history.

(56) References Cited

U.S. PATENT DOCUMENTS

2004/0027369 A1*  2/2004  Kellock et al. ............... 345/716

FOREIGN PATENT DOCUMENTS

| EP | 1422668 | 5/2004 |
|----|---------|--------|
| EP | 1630811 | 3/2006 |
| JP | 10-051752 | 2/1998 |
| JP | 11-341440 | 12/1999 |

(Continued)

OTHER PUBLICATIONS

Hua et al., "Optimization-Based Automated Home Video Editing System", Transactions on Circuits and Systems for Video Technology, vol. 14, No. 5, May 2004, pp. 572-583.

*Primary Examiner* — Thai Tran
*Assistant Examiner* — Girumsew Wendmagegn
(74) *Attorney, Agent, or Firm* — Fredrikson & Byron, PA

(57) ABSTRACT

A method (100) of automatically editing audio and visual recordings to produce an audio-visual production using computer processing means. The method (100) involves a first step (101) of setting production criteria in which the desired production duration, target device, maximum execution time and location of media files are specified. In a second step (102) a style is selected for applying to the media files. A third step (103) of selecting ones of the media files involves selecting those media files in folders which have been accessed most recently by a user, based on awarding a score to folders. In a fourth step (104), the selected style is applied. This is followed in a fifth step (105) by rendering the production to the target device.

50 Claims, 11 Drawing Sheets

FOREIGN PATENT DOCUMENTS

| | | |
|---|---|---|
| JP | 2003-179859 | 6/2003 |
| JP | 2004-120420 | 4/2004 |
| WO | WO 00/39997 * | 7/2000 |
| WO | WO 02/052565 A1 | 7/2002 |
| WO | 2005101413 | 10/2005 |
| WO | 2005103954 | 11/2005 |
| WO | 2005106878 | 11/2005 |

* cited by examiner

Table 9A

| Creation date | The date and time at which the folder was created in the filing system. |
|---|---|
| Last use date | The date and time at which the contents of the folder or (recursively) those of any of the subfolders it contains were used in some way. |
| Depth number | The depth of the folder in the hierarchy. For example, if the top-level folder has depth number 1, its immediate subfolders will all have depth number 2. Their immediate subfolders will have depth number 3 and so on. |
| Size | Number of media files of given type immediately contained by the folder |

FIG. 9A

Table 9B

| WEIGHT | VALUE |
|---|---|
| $W_A$ | 1.0 |
| $W_C$ | 0.2 |
| $W_S$ | 0.3 |
| $W_D$ | 0.2 |

FIG. 9B

METHOD OF AUTOMATICALLY EDITING MEDIA RECORDINGS

RELATED APPLICATIONS

This application claims priority to International Application No. PCT/SG2004/000409 filed Dec. 13, 2004, the teachings of which are incorporated herein by reference.

This invention relates to a method of automatically editing media recordings to produce a media production using computer processing means.

BACKGROUND

Available Non-Linear video Editors (NLEs) in the form of computer programs for editing video footage are a development of conventional editing methods, such as film cutting and linear dub-editing using video players. NLEs, although implemented by software, are a manual editing tool by which video editing can be performed in substantially the same way as in the more conventional methods just referred to. All of these techniques are well-suited to situations in which the desired result is a single, high-quality video production. These techniques are not, however, well-suited to generating a number of editing alternatives of a video production in a quick and easy manner. For this reason, these existing techniques are not favoured by novice video editors, such as those wishing to edit footage taken with a newly-acquired home video camera. A novice video editor is usually forced either to make do with whatever he might be able to create quickly, or to spend a significant amount of time in a trial and error approach to generating an acceptable production.

A number of trends in this area are creating a need for a new approach to video editing and production. One such trend is the rapid growth in the amount of video material being recorded, particularly by the amateur non-professionals. The widespread use of Digital Video (DV) cameras, for example, results in a large amount of material being recorded in digital format, and of very high quality, event when taken by the amateur. The cost of editing this type of video material, however, using traditional techniques in order to achieve an acceptable result would be, in many cases, prohibitive for the home user.

Another trend is the increasing degree of control that viewers demand or expect over the video material that they watch. This trend is particularly true for factual video material for educational and professional uses. For example, there is a growing need to make bodies of video material available in a variety of different forms, such as in video productions of different lengths, with different emphases, and aimed at different audience demographics.

Yet another trend is the increasing availability of pictures and video material in digital format and on the Internet. This is at least partly due to the popularity of digital cameras, camera phones and personal digital assistants (PDAs) with built-in cameras. Also responsible are developments in video compression technology that have made it possible to create high quality video material that takes up a reduce amount of space. Thus, it is possible to use these portable devices to capture high quality material that is easy to store and transfer between devices.

Users of currently-available non-linear video editors, such as PREMIERE from ADOBE, INC., and FINAL CUT PRO from APPLE, INC., generally are required to prepare the source material before the editing process can begin. This preparation includes, logging tapes on which the source material is recorded, selecting suitable or required footage from a larger body of available footage, selecting a suitable audio track, selecting suitable images to be used as interstitials. Although not all these tasks are required for every editing operation, the process of gathering and sorting the suitable media requires some considerable effort.

Before editing can be carried out, it is also usual to perform a logging operation. Logging is a manual process in which the user creates a document that provides detailed information of the footage that is recorded on a particular tape, or other medium. This information might include the location, length of scene and so on. Once the logging is completed, the editors will be able to pick desired material based on the information generated during the logging process. Although it is a fairly common process, there does not exist a single standard procedure or form for representing this information. Hence, the quality of the logging may vary from team to team and project to project. This also means the subsequent selection of material is mainly influenced by how well the logging process was accomplished. A well done logging process will enable the editor to make a better informed decision when selecting suitable material. MUVEE AUTOPRODUCER, which is an embodiment of International Publication No. WO2002/052565, is a software application that pioneered the field of automatic video editing. PINNACLE STUDIO 9, ULEAD, VIDEOSTUDIO 8, MAIN CONCEPT EVE 2.0, MICROSOFT MOVIE MAKER 2 are also software applications that provide some form of automatic video editing. Automatic video editing is an automatic process in which media is sequenced in such a manner so that it looks as if it was edited by an editor. The quality of the output varies depending on the software application.

However, automatic video production systems such as the software applications referred to above still pose a substantial entry barrier for a typical user. This is mainly due to the time that must be spent in using these applications, and in associated operations, if a video production of the desired quality is to be produced. For the novice user to wants to produce a production quickly and easily, using these applications can be quite tedious. The tediousness of the process is greatly amplified if the applications are used on a device with a small display size such as a smart phone or a PDA (Portable Digital Assistant).

It is an object of this invention to address these disadvantage associated with the prior art.

SUMMARY OF THE INVENTION$_{[SS1]}$

According to a first aspect of this invention, there is provided a method of automatically editing at least visual media recordings to produce a media production using computer processing means, the method including the steps of:
a) setting production criteria, the production criteria including criteria imposing constraints on the method;
b) automatically selecting ones of the discrete media recordings, including at least ones of the discrete visual media recordings, from the or another collection thereof based on attributes of the recordings or of groups of the recordings.
c) producing editing instructions indicative of how the selected recordings are to be operated on by the or other computer processing means to produce a media production that satisfies the production criteria.

According to a second aspect of this invention, there is provided a method of automatically editing at least visual media recordings to produce a media production using computer processing means, the method including the steps of:
a) setting production criteria, the production criteria including criteria indicative of at least one of: a location in which a collection of discrete media recordings, including at least discrete visual media recordings, is stored so as to be accessible by the computer processing means and from which recordings are to be selected, a preferred duration of the media production, and the type of device on which the media production is to be played;

b) automatically selecting ones of the discrete media recordings, including at least ones of the discrete visual media recordings, from the or another collection thereof based on attributes of the recordings or of groups of the recordings.

c) producing editing instructions indicative of how the selected recordings are to be operated on by the or other computer processing means to produce a media production that satisfies the production criteria.

By selecting discrete media recordings based on similarity between attributes thereof, it is possible to produce a production that is likely to have some coherency, or in some way seem well-ordered to a user. In this way the media production, even though produced automatically, is likely to appeal to the user. For example, video and audio recordings may be chosen that have one or more similar or the same words in their titles. If this word were, for example, "Italy", the method may well give rise to a montage of video footage of holidays by the user in Italy, set to an appropriate soundtrack.

In this way, embodiments of the present invention address this entry barrier to the novice user associated with prior art software applications referred to above.

Embodiments achieve this by proposing a method in which input media files to be used to create stylized productions are selected automatically and intelligently such that the selection is coherent and relevant to the context in which the user is creating the production. By performing the input media selection intelligently and with minimal or no user intervention, the user feels that the system is very easy to use and the entry barrier is reduced. A user might simply be required to launch the operation and everything else, including selecting the production's style, can proceed automatically, thereby yielding instant gratification. In addition to speed, the method may result in productions that the user might not have even thought about creating. Such productions would inspire the user to try new ideas that they otherwise might never have tried. For a user who has a large collection of material to choose from, such an intelligent selection method can bring up coherent sets of files that the user has long forgotten about, thereby allowing exploration of a large space both in terms of utility and for entertainment.

The or each media recording may be a visual recording, an audio recording or an audio-visual recording. The expression "visual recording" is used herein to refer to both recordings that are made up from a series of still images that go to form a moving image, such as a film or "movie", and recordings made up from a single still image, such as a photograph. One or more of the visual recordings may therefore be a recording of a single still image, such as a photograph. One or more of the visual recordings may be a recording of a series of still images that go to make up a moving picture, such as a film or "movie".

The production criteria may include a criterion that specifies a level of perceived quality that the media production should have, wherein media recordings would be selected that are recorded to that specified level of quality. The media recordings may, for example, be selected based on the sampling rate in the case of an audio recording, or a resolution in the case of a video recording.

The location in which the collection of discrete media recordings is stored may be within a filing system organised under a computer operating system, such as MICROSOFT WINDOWS. The filing system may be a hierarchical filing system, such as NTFS as used under MICROSOFT WINDOWS. The location may be on local storage means accessible by the computer processing means such as, for example, a hard disk drive, RAM, or a removable storage medium such as a flash memory drive or a CD-ROM. The location may be on remote storage means accessible by the computer processing means over a network, such as the Internet.

The media recordings may be stored in one or more directories or folders in such a filing system. It is envisaged that, where this is the case, each discrete media recording would be a respective file in such a directory or folder, such as, for example a respective video, picture or audio file. The production criteria set in step (a) may include specifying at least one directory or folder, the contents of which are to constitute the collection. Specifying at least one directory or folder may result in any sub-directory or sub-folder contained therein also being specified, such that the contents of the or each sub-directory or sub-folder additionally forms or form part of the collection. Where the location includes a reference to one or more media recordings that are stored elsewhere, but accessible by the computer processing means, that or those recordings may be considered as if they were in the location. The references may be links in a filing system organised under a computer operating system. The references may be in the form of a playlist. The production criteria in step (a) may include specifying at least one playlist that is stored within the filing system. An example of such a playlist is one created by WINDOWS MEDIAPLAYER. The production criteria in step (a) may include specifying at least one website at which at least part of the collection of media recordings is located. Each file may include one or more video clips, pictures and/or music.

Step (a) in the first and/or the second aspect may include setting a production criterion indicative of a supply of media recordings information from which information indicative or one or more media recordings is supplied. The or each supply may include one or more media streams. For example, media recordings may be streamed from one or more devices that are arranged for communication with the computer processing means. The method may include the step of analysing one or more of the media streams to identify and store portions which are capable of satisfying the production criteria.

Each recording may have attributes associated therewith. The attributes may include attributes indicating at least one of: the time of recording, the location of recording, the subject of the recording, the title of the recording, the time the recording was last accessed by a user, and the frequency of access by the user. Groups of recordings may have attributes associated therewith. Each group may be a group of recordings that is located together in a particular location. Each group may be a group of recordings that is located together in a folder or directory organised under a computer filing system. The attributes of each group of recordings may indicate when one or more of the recordings in that group was accessed, recorded and/or modified, and/or the subject and/or title of one or more of the recordings. The attributes of each group of recordings may indicate when the folder or directory containing the group was accessed, created, modified and/or the level of that folder or directory in a hierarchy of such folders and/or directories. The attributes of each group may also indicate the title of the folder or directory containing the recordings in that group.

Step (b) may include selecting discrete ones of the media recordings based on similarity between at least a respective attribute of each recording. Step (b) may include selecting groups of the recordings based on similarity between at least a respective attribute of each group. Step (b) may include scoring groups based on their attributes and selecting groups that have similar scores. Step (b) may include ranking groups in order based on a first attribute and selecting juxtaposed ones of the groups in when so ranked. Step (b) may include awarding each ranked group awarding that group a first score indicative of its rank. Step (b) may include additionally ranking groups in order based on a second attribute and awarding each group a second score indicative of its rank based on that second attribute. Step (b) may include using the first and second scores to arrive at an overall ranking based on at least both the first and second attributes, and may include selecting one or more groups based on its position in that overall ranking.

Selecting a group may result in one, more or all of the recordings therein being selected.

Each group may contain one or more recording therein.

The selection of the selected ones of the discrete recordings, and/or the scoring, may be such that over successive iterations of the method, recordings that have not been previously selected are selected. The scoring scheme may be such that the most recently recorded, the most used, and/or the most organised recordings will be selected before others of the recordings.

Step (b) may include selecting one, more or all of the discrete media recordings in the collection on the basis that each has a respective and corresponding attribute that are all similar to one another. Step (b) may include selecting one, more or all of the discrete media recordings in the collection on the basis that each has a respective and corresponding attribute that are all within the same particular range. The method may include the step of setting the particular range. The range may be a temporal range, such as a particular month or season. Step (b) may include selecting one or more discrete media recordings by sorting some or all of the recordings in the collection into order based on the at least one corresponding attribute of each recording, and selecting a contiguous group of the sorted collection of recordings. Step (b) may include sorting some or all of the recordings in the collection into the order in which they were last accessed, and/or modified, and/or the time of their recording. Step (b) may then include selecting certain of the ordered collection that were most recently accessed, and/or modified, and/or recorded. Step (b) may include selecting one, more or all of the discrete media recordings in the collection on the basis that each has a respective and corresponding attribute that includes common information. The common information may be, for example, a number, word, part of a word, or a plurality of words. The common information may be, or be contained in, a title of the recording.

The attributes may include pre-existing information that is associated with the media recordings. The pre-existing information may be stored with the media recordings with which it is associated. Where at least some of the media recordings are files stored in a filing system organised under a computer operating system, the pre-existing information may include information normally assigned by the operating system to such files. The pre-existing information may include the time of recording, the time of last modification of the recording, the time of last accessing the recording, the size of the recording and/or the file format of the recording. The pre-existing information may include information normally assigned by the operating system to a folder or directory in which the media recordings are stored. One or more recordings may have information indicative of the location of recording recorded therewith. This information may be in the form of coordinates provided by GPS apparatus.

The pre-existing information may be information inherent in any referencing system used to reference to media recordings, or information associated with the references as maintained by the referencing system.

The pre-existing information may include metadata. The metadata may include information indicative of the circumstances in which the recording with which that metadata is associated was made. The metadata may be EXIF data stored inside a picture file captured by typical digital still cameras. The EXIF data may convey the date and time at which the picture was taken, and/or the latitude and longitude of the place in which the picture was taken on cameras with GPS devices, zoom factor, aperture, exposure settings, flash activation, camera orientation (portrait or landscape), resolution of captured image, information about the colour characteristics of the camera such as a CCD sensor. A video file recorded on a video camcorder will contain information indicative of the duration of the recording, and date and time stamps.

The metadata may include data provided by the user as part by manual annotation. This data may include information that rates the user's preference for the recording to which the meta data relates.

Step (b) may include the step of producing a list of discrete media recordings and may also include entering in that list one or more of the attributes of each media recording. The list of media recordings may be of only those recording in the location specified in step (a).

The method may include the step of assigning one or more attributes to one or more of the discrete media recordings in the collection. This step may include analysing one or more media recordings in order to generate content information indicative of the content of that recording, the content information then being assigned to the respective recording as an attribute for use in the selecting of step (b). The content information may be in the form of "descriptors", such as those disclosed in International Publication No. WO2002/052565, the contents of which are hereby incorporated herein by reference. Where the media recording being analysed is a video recording containing a series of images, the analysing may, for example, determine the probability of there being human faces in the recording and assign the recording an attribute that is indicative of this. Where the media recording is an audio recording, the analysing may determine, for example, the volume and/or the tempo of the audio recording and assign the recording an attribute that is indicative of this.

The production criteria set in step (a) may include a criterion indicative of the time that should be spent in carrying out the method or in carrying out one or more of the steps thereof. This criterion may determine the time that should be spent in analysing the media recordings in order to generate the content information and/or the list of media recordings.

The method may include the step of generating an estimate of how long it would take to analyse one or more of the media recordings so as to produce content information therefor, and may include including information indicative of this estimated analysis time in an attribute assigned to the or each respective recording. The method may include the subsequent step of using the information indicative of the estimated analysis time in step (b) to select media recordings that can be analysed in a time specified in the production criteria of step (a). The production criteria in step (a) may include an additional criterion indicative of the time that should be spent in analysing in step (b) so as to produce the content information. Recordings that can be analysed more quickly may be selected for a first media production produced by a first performance of the method by the computer processing means.

The method may include the step of performing background analysis of one or more media recordings so as to produce content information therefor or to generate an estimate of how long it would take to perform analysis to produce content information therefor, this step being performed substantially in parallel to one or more of the other steps and/or when one, more or all of those other steps are not being performed.

Where step (a) includes setting a criterion indicative of a supply of media recording information, the method may include the stop of analysing some or all of that supply as that supply is received. The method may include analysing one or more media streams in real time. The method may carry out the subsequent steps thereof to produce also and/or play the production in real time.

The attributes may include user-created links between certain of the discrete media recordings in the collection thereof. The method may include the step of a user creating such links. In step (b), selecting one recording that includes such a link to another recording then results in additionally selecting that other recording. Links may be created from a plurality of recordings that may share an attribute to one or more other recordings in the collection. A link may be created between every recording in a particular directory and one or more other recording in another directory.

The method may include that step of recording that one or more media recordings have been selected in one iteration of the method such that it or they are not select in the or a subsequent iteration of the method. The method may keep count of the number of times that one or more of the media recordings is or are selected, and may be such that it progressively tends not to select those recordings as their count increases.

The method may also include the step of setting style information that determines the editing instructions and hence the way in which the selected media recordings are operated on in step (c) so as to determine the way in which the selected media recordings are presented when the production is played back. The style information is such that it results in the media production having a discernable style. The style information may be such that it results in transformations and/or special effects being applied to the selected recordings. For example, the style information may be such that it results in a transformation being applied to the selected recordings such that the media production is in black and white, and being slightly speeded up, to give the media production an old fashioned style. The style information may include instructions to produce a media production with a seasonal style. Setting a seasonal style may result in one or more media recordings being selected that have a date of recording in that season. Recordings with a title that includes a reference to that season may also be selected. For example, the style information may include instructions to produce a media production with a seasonal style, such as an autumnal style or with a Christmas style.

The step of setting the style information may precede step (b). Where this is the case, the style information may at least partly determine the media recordings that are selected in step (b). Preferably the style information results in media recordings being selected that fit or in some way reflect the style of which the style information is indicative. For example, the style information may specify a seasonal theme, which may result in one or more media recordings being selected that have a date of recording in that season. Audio recordings with a title that includes a reference to that season may also be selected.

The step of setting the style information may follow step (b). Where this is the case, the style information may be at least partly determined by the media recordings that are selected in step (b). The style information may be at least partly determined by at least one of the attributes for the media recording selected in step (b). The style information may be determined, for example, by the time of recording. For example, where one or more of the selected media recordings has a time of recording that falls in a particular season, the style information may be set to result in a media production that has the characteristics of that season. For example, if one or more media files are selected with a time of recording in the month of December, a Christmas style may be set. Setting a Christmas style may result in the production of a media production may have falling snow flakes superimposed thereover, with a border of holly leaves around the periphery of the viewing area.

The style information may be determined by a user by, for example, selecting a particular style from a list of styles. The method may include the step of the computer processing means receiving style information from a user. The style information may be determined automatically. The style information may be determined automatically in a random way. The style information may be determined automatically such that each iteration of the method results in a style being set that differs from the style set in the previous and/or the following iteration.

The style information may be determined automatically at least partly based on the time and/or date of initiating one or more steps of the method. For example, initiating the method in the month of December may result in a Christmas style being set.

Step (c) may be followed by the step of the computer processing means carrying out the instructions produced in step (c) so as to produce the media production. The media production may be produced in a form in which it can, for example, be played by display means, and/or transmitted to other computer processing means and/or computer storage means for storage therein. The step of carrying out the instructions may be followed by the step of saving the media production in computer storage means, such as for example, a magnetic storage medium such as a hard disk drive, or a solid state storage medium such as RAM. Step (c) may be followed by the step of the computer processing means playing the media production so as to present the media production to the user. Step (c) may be followed by the step of transmitting information indicative of the media production to other computer processing means for storage and/or display by those other means. The transmitting may be in the form of data streaming. The other processing means may be the device on which the media production is to be displayed.

The instructions may be in the form of an Edit Decision List (EDL). The instructions may be in the form of a media file arranged for playback. The media file may be, for example, an MPEG file.

The computer processing means and/or the other computer processing means may be embodied, for example, by one or more of the following: a personal computer, a personal digital assistant, a dedicated video-editing box, a set-top box, a television, a games console, a digital camera, a camcorder, a camera-phone, a mobile cellular phone, a portable music player, a portable media player capable of playing video and audio, a DVD player or recorder, a digital video recorder, a personal video recorder.

The device on which the media production is to be played may be termed the "target device". The target device may be relevant to the way in which the steps of the method are carried out because the media production should be such that it can be adequately played on the target device. Examples of target devices are a display such as a computer monitor viewed by a user, portable devices such as Portable Digital Assistants (PDAs), smart phones such as the NOKIA 7610 and Portable Media Players (PMPs) such as the ARCHOS MULTIMEDIA JUKEBOX, a remote display terminal such as an X11 terminal, displays of stand alone multimedia kiosks.

The media production may, for example, be stored for retrieval on distribution media such as CDs and DVDs or on a web storage and server system that can stream media files to one or more requesting users.

In the case of a mobile cellular phone being the target device, the method may be such that the media production be in a 3GP format video file at a resolution of 176×144. In the case of a personal computer being the target device it is preferred that the method be such that the media production be in a 24-bit RGB format at a resolution of 640×480. Similarly, the audio subsystem of a computer may driven by 44100 Hz, 16-bit stereo sound.

The step of carrying out the instructions produced in step (c) so as to produce the media production, may be done so as to produce the media production in realtime. That is, successive parts of the media production are produced and made available for display by display means or storage in computer storage means with which the computer storage mean can communicate, at the time that those parts would be viewed in the media production.

The method may be such that, not all the instructions are carried out, or such that the instructions are produced, in order that the production can be played in realtime.

Preferably, the method is such that the audio-visual media production can be produced with minimal input by the user. The method may be such that the audio visual production can be produced with no input from the user, save as to initiate the running of the method. The method may be such that the audio-visual media production can be produced by the input of only a small number of instructions from the user. The number of instructions needed from the user may be one or two or three, for example. The method may require the user only to input a single instruction, the method automatically performing the subsequent steps to produce the production. The instruction may be, or the instructions may include a start instruction. The instruction may be, or the instructions may include, specifying the production criterion or criteria. The instruction may be, or the instructions may include, specifying the attribute or attributes on which the selection is to be based. The instruction may be, or the instructions may include, selecting the style.

The method may include the step of the computer processing means automatically downloading media recordings from external target devices in communication therewith to store those recordings on local storage means accessible by the computer processing means. The method may include the step of the computer processing means automatically transmitting information indicative of the media production to one or more external target devices such that the media production can be played thereon. The automatic downloading and/or transmitting may take place automatically upon the computer processing means and the or each device being brought into communication with one another. This may be by way or a wired or wireless connection. This may be by synching the or each target device with the computer processing means. The method may be such that it is repeatedly performed by the computer processing means. And may be such that it is only interrupted by user intervention. The steps of the method, apart from the playback of a media production produced by the method, may be continuously carried out so as to at least produce the editing instructions of step (c) for one or more media productions whilst a media production that was produced previously by the method is being played.

For the avoidance of doubt, references to a "time of recording" in this specification should not necessarily be taken to be references to a time of day. Instead, this should be taken as a general term that includes the date and/or time or recording.

According to a third aspect of this invention, there is provided computer processing means programmed and operable to carry out a method according to any preceding claim.

According to a fourth aspect of this invention, there is provided a computer program including code portions which when executed by computer processing means cause those means to carry out a method according to any preceding claim.

According to a fifth aspect of this invention, there is provided a record carrier having information recorded therein or thereon which is readable by computer processing means to cause those means to carry out a method according to any preceding claim.

The record carrier may be an electrical signal or a radio frequency signal

Thus it is intended for embodiments of this invention to provide methods of automatic video production that are capable of functioning with little or no intervention by the user. This is achieved by providing methods for automatically selecting a subset of the media recordings made available in a referencing system using the information inherent in the structure of the referencing system or associated with the referenced themselves, automatically or manually selecting a desirable editing style for the productions, creating one or more productions and playing them on a display or rendering them to files. In a "zero-click" embodiment, the productions are created automatically and continuously upon initiation. In a "one-click" embodiment, a production's editing style is selected by the user before the production is made. In a "multi-click" embodiment, the user chooses to specify more of the aspects of the production in a step of specifying production criteria.

None of the currently available automatic video editing tools provide the capability for automating the selection and preparation of media for automatic video editing. When using available tools, editors are still required to select material on which the automatic video editing will be performed. Although this is necessary if a production is to be made that satisfies a specific requirement, there are some users who may find automatic selection of material useful and entertaining. For this to be truly useful, however, the selection process should be intelligent enough to select relevant material for the current production. Understanding the relevance and generating a set of rules to perform the selection process to satisfy the relevancy can be referred to as Intelligent Media Selection. This makes it possible to create a system in which video productions could be created with effectively a single initiation, may be in the form of a single mouse click. Thus, it is possible to create stylized audio visual productions from a set of media files with little or no intervention by the user.

Typical applications of embodiments of the present invention include the production of video and other time-based media for home, corporate and hobbyist environments, production of slideshows synchronized to music, production of rich-media electronic greeting cards, production of media for world-wide-websites, production of rich-media online catalogues, production of rich-media online content related to consumer-to-consumer sales applications such as online auctions and classified advertisements, and some professional video applications such as the production of karaoke videos, automatic video player, and Do-It-Yourself Photo Kiosks.

BRIEF DESCRIPTION OF THE DRAWINGS

Specific embodiments of the invention are now described by way of example only and with reference to the accompanying drawings, in which:

FIG. 9a lists folder information that is logged in the logging steps of the first embodiment;

FIG. 9b lists typical values used for weighting in the scoring steps of the first embodiment shown in FIG. 7;

SPECIFIC DESCRIPTION OF EMBODIMENTS OF THE INVENTION

Figure 1:
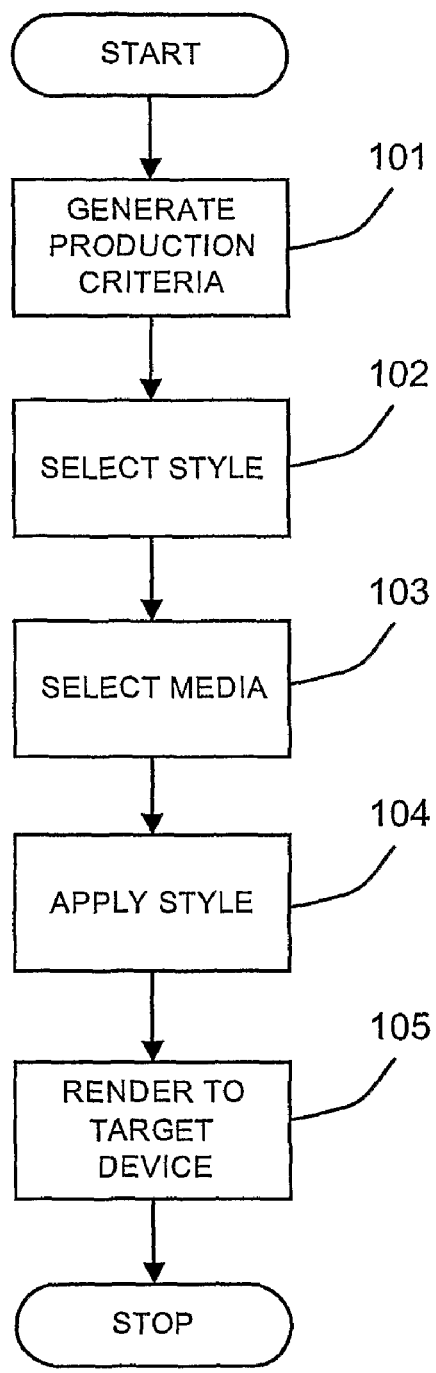
FIG. 1 shows, in overview, steps of a method that embodies this invention.

FIG. 1 is a flow diagram that shows, at a general level, steps of a method 100 that is a first embodiment of this invention. The method 100 is a method of automatically editing media recordings, in the form of computer files, to produce a media production, in the form of an audio-visual (AV) production, using computer processing means in the form of a personal computer (not shown). It is envisaged that the method is carried out by a personal computer running under the control of appropriate software. One advantageous characteristic of the embodiment is that the said AV productions can be created with a single initiation step such as a mouse click, with optional further user intervention to select styles$_{[LSS2]}$, which are described in detail below.

With reference to FIG. 1 the method 100 starts at step 101 with the specification of production criteria. Style information that describes the appearance and feel of the AV production that is to be the output of the method (or the "output production") is then selected at step 102. This is followed by a step 103 of searching for and selecting media files according to the set production criteria set in step 101. The selected media files will be used as input media for the method 100. Once adequate and appropriate input media are selected, the selected style is applied to the input media at step 104 to obtain the output AV production. This production is then rendered, at step 105, to a target device that is to be used to play or store the AV production, the target device, having been specified as part of production criteria in step 101. If the target device is a display device, then step 105 amounts to playing the production. If the target device is a storage device, step 105 amounts to storing the production to a file.

The various steps are now described in more detail below, under appropriate headings.

Production Criteria

Figure 2:
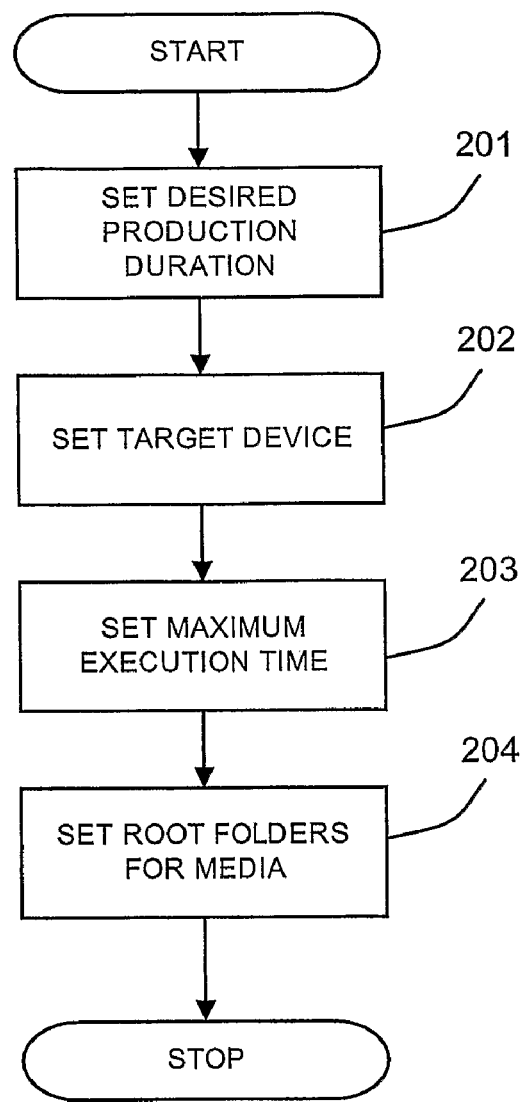
FIG. 2 shows steps involved in setting production criteria during an initial part of the method for use in controlling a media production produced by the method.

The term "production criteria" is used to refer to output criteria, input selection criteria and operation criteria for an iteration of the method 100. FIG. 2 shows the production criteria that are set in this embodiment. The first production criterion that is set is the desired duration for the production. This is an output criterion and is set at step 201. The next production criterion that is set is the type of target device. The type of target device is set at step 201 as being, for example, a computer display, a camera phone or a DVD player. This is also an output criterion and is set at step 202.

Input selection criteria are set at step 204. This includes a criterion that specifies where to look for media files to use as input to the method. In the present embodiment, one folder each is specified for video files, picture files and music files at step 204. Step 204 also includes setting the properties that the selected media files must have. The properties of media files are referred to broadly as "metadata" and include but are not restricted to values such as file creation date, last usage date, frequency of usage, the date on which the media was captured from a recording device such as a camera or camcorder, the earth coordinates—latitude and longitude—of the place where the contents of the media file were recorded, and so on.

Output criteria are set at step 203. These are to specify the maximum execution time for the method 100, and to specify spatial constraints within which the method 100 must operate. For example, is may be specified that the selection of media files must complete within a specified time limit.

The duration of the output AV production requires the media selection step at 103 to select adequate material to create such a production. Longer output durations will require more input material to be selected in order to create an appealing production.

The input selection criteria are intended to ensure a common set of properties across all the selected input media files. The invention uses the fact that files grouped together under a folder in the file system often have some common characteristic significant to the user. Therefore using only the information inherent in the structure of the filing system of the media files is adequate to ensure some common characteristics at the very least. In alternative embodiments, additional metadata, such as place and date of recording, may supplement the information inherent in the file system in order to yield even better coherency among the selected input media files.

The operation criteria are intended to provide instant gratification to the user. The user must be able to obtain an acceptable production within a specified amount of time. If it takes too long to create a production from the user's media files, the user may lose interest. To this end, a time limit is specified within which the operations of indeterminate running duration must be completed. For example, when the method is performed on relatively slow hardware or with slow storage, the search for media files may be terminated midway and the subsequent steps will be performed in a preferred embodiment. The search is then resumed after the first production is complete and the method is restarted to create a second production. A person skilled in the art to which this specification relates may be able to devise and implement different selection strategies for different time limits and hardware. Such a strategy may also include notifying the user of the situation and asking whether a longer wait for the selection process would be acceptable.

Style Selection

As can be seen from FIG. 1, the second general step in the method is that at 102 of selecting a style. An interesting feature of the present embodiment is the ability to create various, different, stylised AV productions using a single set of input media, by means of selecting different styles. A typical user of the system is not expected to understand all that a style specifies and how it achieves the appearance and feel of the output production that the user sees, but the user will be able to notice that changing the input media or the output criteria and repeatedly creating productions with the same style will result in productions that "look and feel similar" even though they contain different portions of input media. However, since the input music is also substantially responsible for the emotional appeal of the output production as dictated by a style, it is better to keep the input music also fixed in order to clearly perceive that the look and feel of productions do not change if the style is not changed. The use of such styles in editing is described in International Publication No. WO2002/052565, the contents of which are incorporated herein by reference.

An example of a style is a "Classic sepia" style. This style simulates the feel of old movies by emulating the higher film speed, film scratches and by adding a sepia tone effect to the production.

Figure 3:
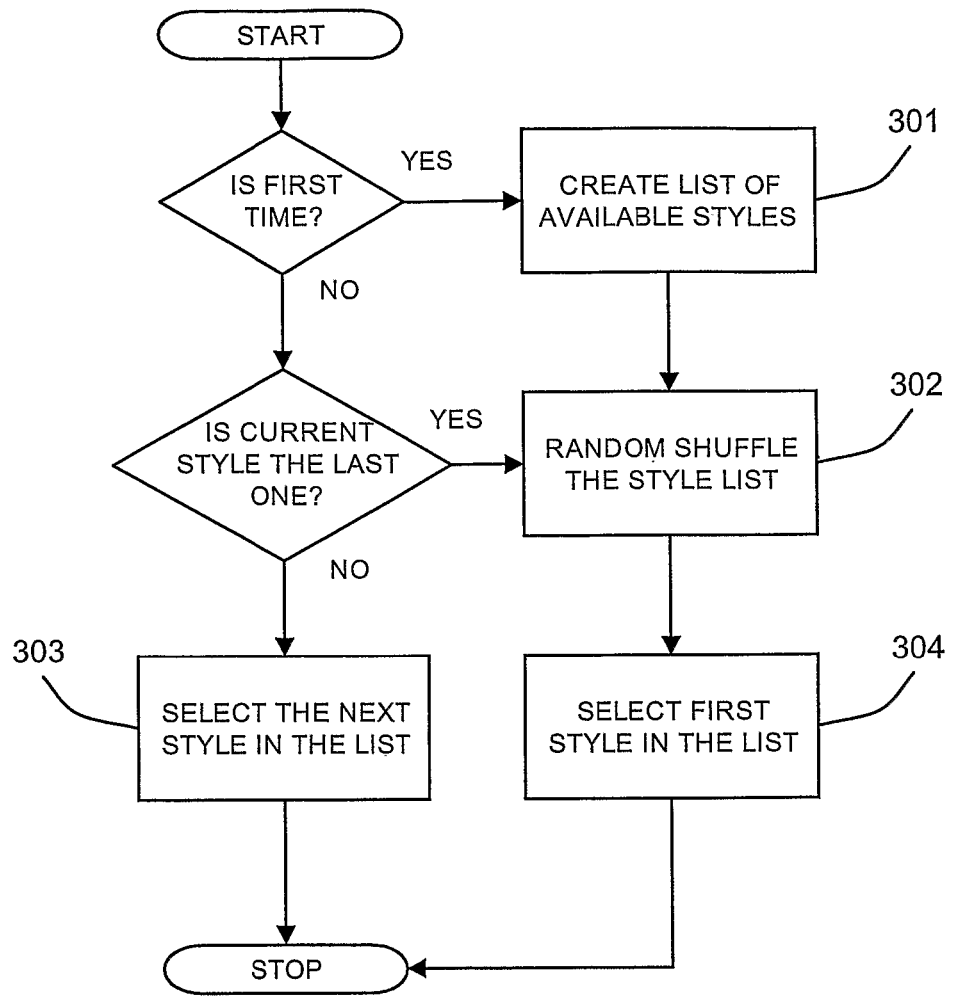
FIG. 3 shows steps involved in randomly setting style information for use in a subsequent part of the method to that shown in FIG. 2.
Figure 4:
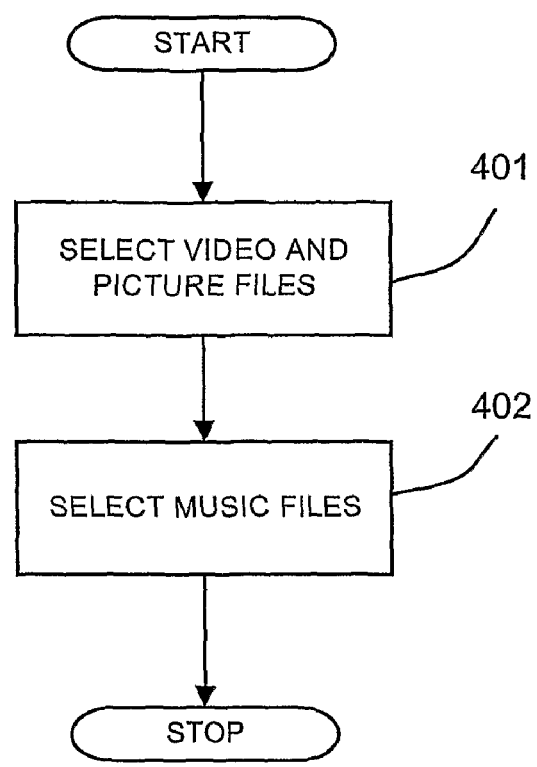
FIG. 4 shows in overview the steps involved in selecting media files for use in the method.

In this embodiment, the step of selecting a style at 103 is performed automatically in a random shuffled order according to the flow chart shown in FIG. 3. Additionally, a user is allowed to override the automatic style selection. The purpose of selecting a style automatically is to reduce the amount of user involvement in the creation of the output production and contributes towards a system that can run after a single launching step such as a single mouse click. Selecting a style in a random shuffled order will ensure that with the generation of successive productions, the user experiences a variety of styles. It also ensures that, over time, all available styles will be used. If the style selection has been overridden by a user, then the user-selected style is used instead of the one decided by the automatic method. FIG. 3 shows that, the first time the method is run, a list of available styles is generated at step 301. At step 302, this list is then shuffled in a random manner to give a shuffled list. At step 304, the style that is the first in the shuffled list is selected. In a subsequent running of the method, it is ascertained whether or not the style just used is the last one in the shuffled list generated at step 302. If it is not, the next style in the shuffled list is selected. If it is, step 302 is repeated to re-shuffle the list of available styles to create a new shuffled list.

A random shuffled order is not the only possible way to select a style without user intervention. Alternative embodiments may make use of techniques including one or more of:
a) using the same user selected style every time for every production;
b) selecting a style based on the time of the year when the production is being made;
c) biasing the random style selection towards the styles that the user is known to like more than others—the "give me what I like" mode; and
d) biasing the random style selection towards the least frequently used styles—the "experimental" mode.

Media Logging and Input Media Selection

The next step to be described in detail is the step of selecting media shown at 103 in the general flow chart of FIG. 1. Parts of this step are shown in more detail in FIGS. 4 to 7. The input media files may be located on a local or networked filing system, on the internet or accessed from an ad-hoc network such as a set of devices connected via technologies such as Bluetooth or WiFi. Techniques well known in the art can be used to access files from such remote locations. Protocols such as NFS (Networked File System), FTP (File Transfer Protocol), Samba (Windows specific) and HTTP (Hyper Text Transfer Protocol) are some such techniques available for the purpose. Operating systems such as Microsoft Windows usually make all such locations appear and be used by similar means just as though they were a local filing system. Therefore, for simplicity, the description only refers to "filing systems", and the term is expected to be interpreted in this broader context.

The folders in which media files have to be searched were specified in step 204 during the setting of the production criteria. In this embodiment, default values for these folders will be used and the user will not be forced to set them. For example, the recommended folders for placing video, picture and music files in a Windows-based PC are respectively the "My Videos", "My Pictures" and "My Music" folders located in the user's "My Documents" folder. However, it is possible for the user to alter these initial values if other folders are to be searched instead.

Figure 5:
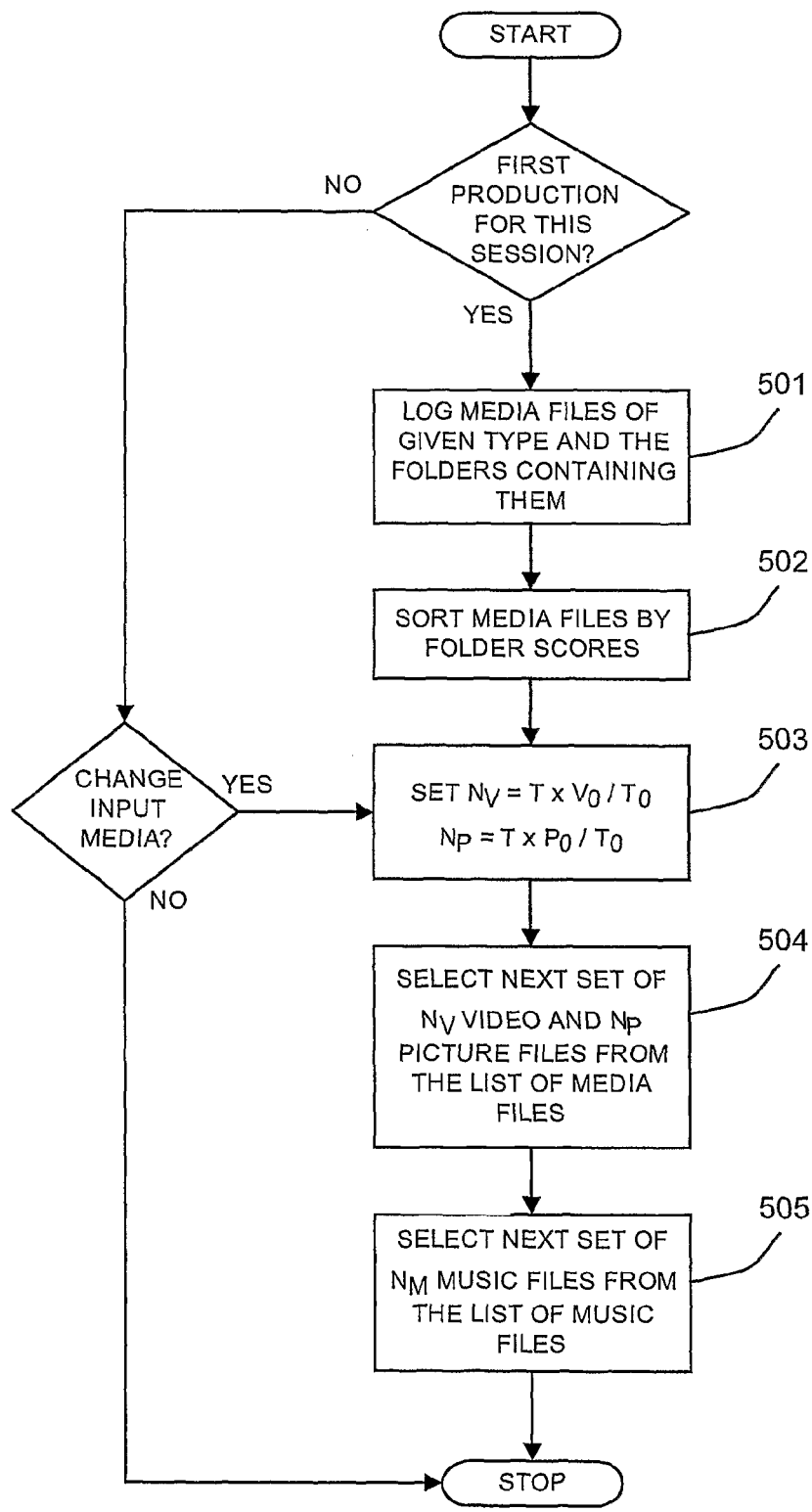
FIG. 5 shows in more detail the way in which media files are selected in a selection part of the method of this preferred embodiment.

The flow chart of FIG. 5 describes the process by which a subset of the media files available in the specified folders on the designated storage medium is selected for use in the creation of the output production. The selection of input media begins with what is called "media logging". This is carried out at step 501. Media logging is broadly the process of scanning specified media folders for media files of a particular type and importing or extracting information about the files and the folders in which they are contained. The amount of scanning and information extraction that can be performed during media logging is severely limited by the operating time limit set in step 203. Therefore, only the type of a media file and some properties of the folders that contain the media files are extracted in the media logging step. These properties are as listed in Table 9A.

In alternative embodiments, information gathered in the media logging step can include one or more of the following:
a) temporal information—this category includes time information about the media file. The capture date, i.e. the date and time at which a media file was recorded by a recording device such as a video camcorder or a digital still camera.
b) spatial information—with advances in global positioning technology such as that based on the Global Positioning System (GPS), it has become feasible to include apparatus that can record geographical coordinates on portable devices such as still picture cameras and video camcorders. The geographical coordinates of a location are typically expressed as a pair of numbers giving the latitude and longitude of the location. In conjunction with a mapping reference, the recorded coordinates can be used to derive the country, state, city, or even the street where the coordinates were recorded. In addition to GPS, some mobile service operators also expose information about the position of a mobile phone which subscribes to the operator. The resolution of this service is, however, not as high as that currently achieved by GPS. Such spatial information, when available after the logging step, can be used to create productions in which selected input media files are all clustered around a single geographical location such as a user's vacation spot.
c) personal information—the media files stored by a user on a typical computer system are likely to be accessed by the user through a variety of player applications such as Windows Media Player, Apple iTunes, WinAmp, Adobe Photoshop Album, and so on. These applications provide features that allow the users to rate the media files, place them in groups called "playlists" and in general manage the media. The applications also keep track of how often a given media file is viewed (or listened to) by the user. Such data relate to the personal way in which a user makes use of a media file. Importing such information as part of the logging step is very helpful towards creating productions that the user will almost definitely appreciate. For example, the simple fact that the user has placed a media file in a playlist indicates that the file is somehow more important to the user than media files that are not in any playlist. Therefore a file in a playlist can be given higher selection preference over one that is not in any such playlist.

d) content information—this category includes content information in the form of descriptors, such as those described in International Publication No. WO2002/052565. Examples include face probability, brightness and quality of visuals, amount of motion or activity in videos and tempo, drive and such qualities of music. These and similar extracted descriptors can be used to log the media files. This category will also encompass picture EXIF data typically stored by a digital still camera inside pictures captured as JPEG/JFIF files.

e) quality information—this relates to the aspects of media files which affect the quality as perceived by a user viewing or listening to the files. Quality for video and picture files has to do with the pixel dimensions of the video (for example, high resolution DV—720×576, low resolution 3GP—176×144), the encoding format (such as H.263, H.264, MPEG4, MPEG1 and WMV) and the extent of lossy data compression applied in the encoding. Quality for music files has to do with the sampling frequency, sample size, number of channels, encoding format (such as MP3, AAC and WMA) and the extent of data compression applied. Since the various encoding formats were intended for different needs, such quality information made available as the result of media logging can be used subsequently to select, for instance, only high quality input to create a high quality output production.

If more time is available for media logging, alternate embodiments may choose to extract metadata about media files such as EXIF data from picture files captured by digital still cameras. Other embodiments may also choose to analyse each media on the file system in order to obtain detailed descriptors about the content of each media file, such as the probability of human faces, brightness, and visual quality. The more detailed the available logging information, the more the coherence that can be enforced among the selected input media files and the more aesthetically appealing the step of constructing the output production can be.

The present embodiment, however, only uses quickly acquired folder properties for selecting input media files. This reduces the system's dependence on time consuming operations such as metadata extraction and media analysis by digital signal processing (DSP). Folder properties listed in Table 9A, by comparison, are determined much more quickly. This is sufficient to create interesting productions, but other embodiments can choose to be more sophisticated and collect more detail during the media logging step.

It is to be noted that a large subset of the file properties, metadata and descriptors associated with a media file do not change with time. These properties therefore need to be extracted or computed only for the first time a given media file is used to create a production. When the media file is used again, only those properties that can change with time need be re-collected, thereby saving substantial time in the media logging step 501. The unchanging properties extracted during media logging are typically cached on the filing system itself in order to speed up access to the data. This is possible for those descriptors which are independent of the editing style in which they will be used, which is normally the case by design.

Figure 6:
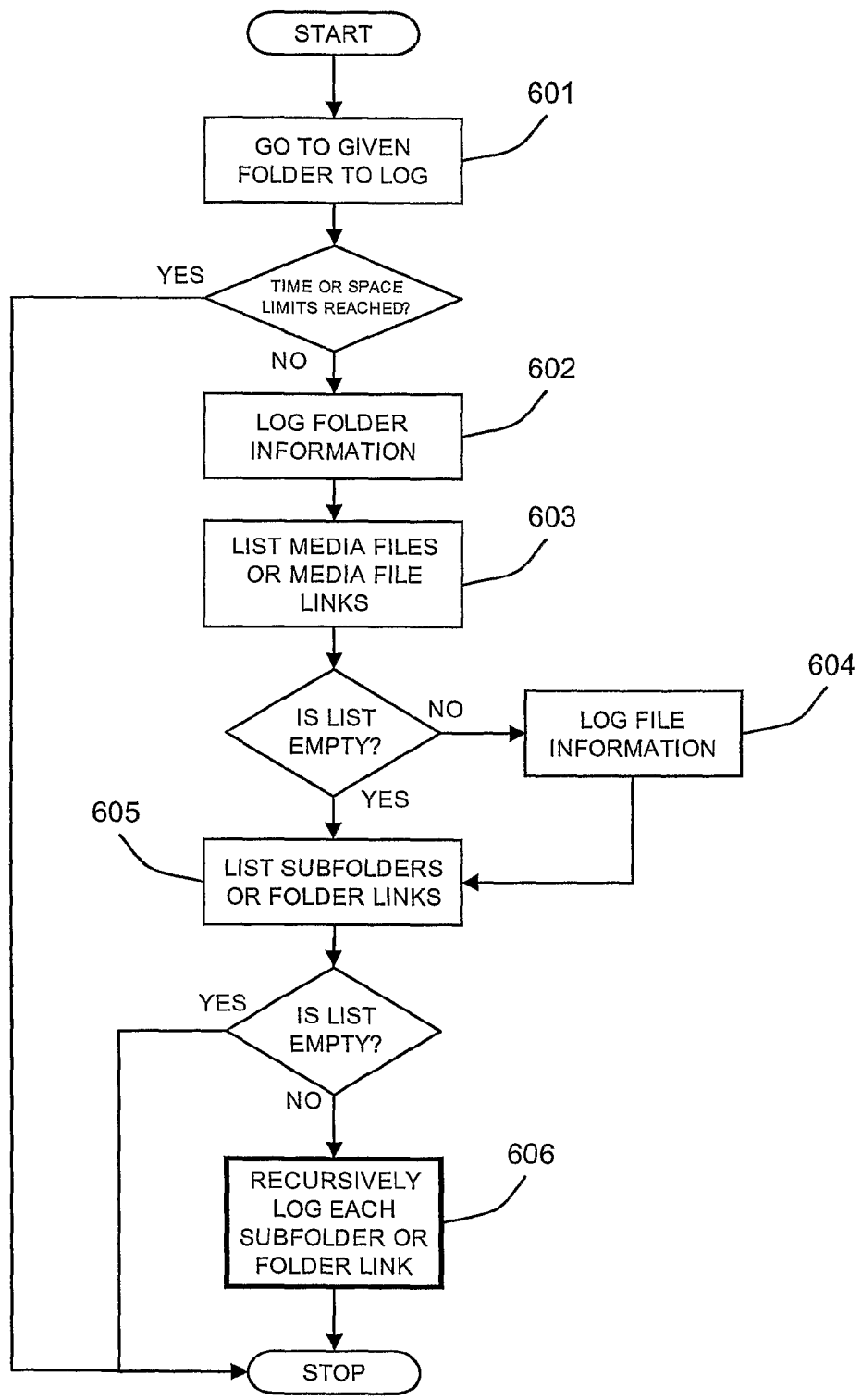
FIG. 6 shows logging steps carried out in an initial part of the selection illustrated generally in FIG. 5.

The sequence of steps necessary in this embodiment to perform media logging is as shown in FIG. 6. These steps are numbered from 601 to 606 and can be implemented on any computer with a storage based on a hierarchical filing system. At step 601 the method goes to the folder that is to be logged. The information listed in Table 9A is then obtained for that folder from the file system in step 602. A typical hierarchical filing system would support the concepts of "folder links" and "file links". Links need to be treated specially when traversing hierarchical folders. A folder link is a folder that is simply referring to another folder in the filing system and is itself not a folder. In the present method, a folder link is treated just as though it is replaced by the folder to which it is referring. Similarly, a file link is simply referring to a file that is located elsewhere in the filing system. In the present method, a file link is also treated as though the file to which it refers is substituted therefor. The media logging process is terminated if the operation time limit set in 203 is exceeded.

In another embodiment, media logging may be performed in the background while the application continues to make productions in the foreground using only the available logging information.

After the available media has been partially or completely logged, a subset of media files from the set of available media files needs to be selected. This is performed in steps 502, 503 and 504 shown in FIG. 5. The select input media step uses the information catalogued in the media logging step to select files which satisfy the production criteria set in step 101. The general case of such a requirement matching operation is complex and can take very long to perform on modest hardware. Therefore in this embodiment, the extent of media logging information used to perform input media selection is considerably limited. Additionally, an embodiment which accomplishes the first production of a given session as quickly as possible making any necessary and acceptable compromise in the media logging step is highly desirable.

Figure 7:
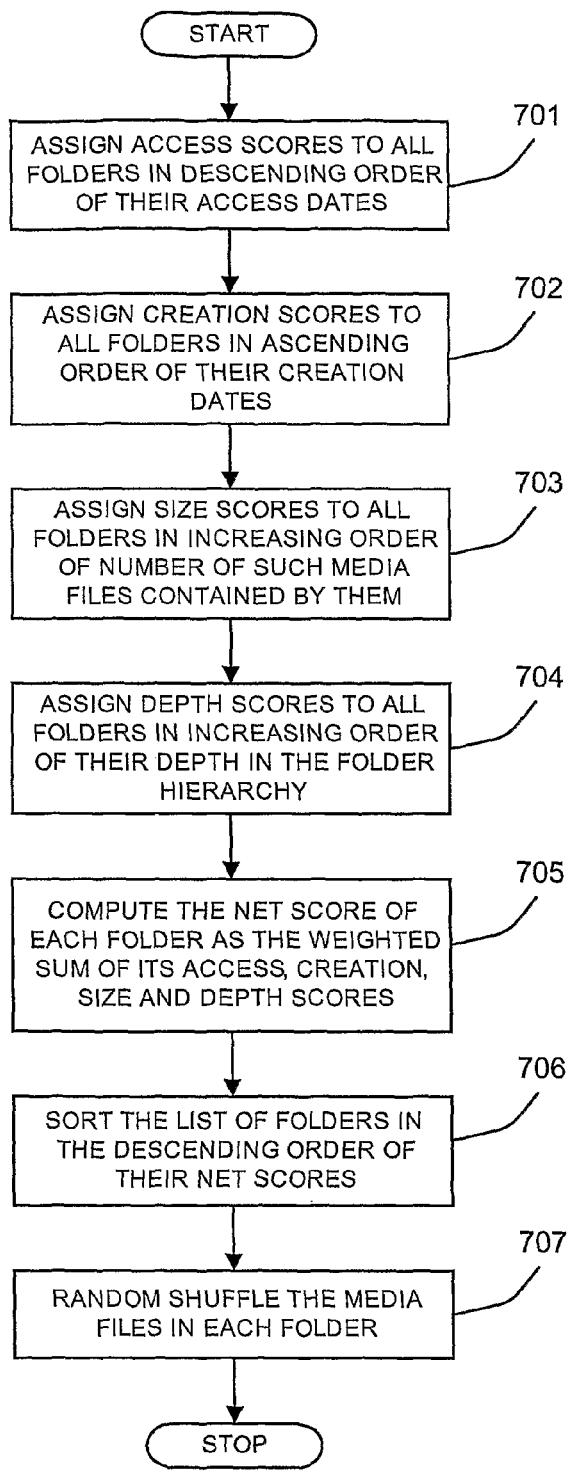
FIG. 7 shows scoring steps carried out in a subsequent part of the selection illustrated generally in FIG. 5.

With continued reference to FIG. 5, the folder information-based input media file selection method described herein is based on the premise that if the user has taken the trouble to organize media files into folders, then the structure imposed by the folders on the media files are relevant to the selection of groups of related media files—that is, there is information inherent in the structure imposed by the user on groups of related media files. FIG. 7 shows in more detail the sub-steps that are carried out in step 502 and shows the sequence of steps in a folder information-based scoring scheme used to order the set of logged media files in preparation for selecting a subset of media files for use as input material. This scoring scheme is now explained in detail.

To each folder, a set of four scores are assigned based on the properties of the folder and the structure of the file system to which it belongs.

The first score is the access score of a folder. This is denoted by $S_A$ and is an integer determined by first sorting the list of folders in the descending order of their last access dates. The access score of the folder is simply its position (starting from 1) in this sorted list. Thereby the more recently accessed folders get lower scores. The access scores of all the folders are computed in step 701.

The second score is the creation score of a folder. This is denoted by $S_C$ and is an integer determined by first sorting the list of folders in the ascending order of their creation dates. The creation score of the folder is simply its position (starting from 1) in this sorted list. Thereby the more recently created files get the higher scores. The creation scores of all the folders are computed in step 702.

The third score is the size score of a folder. This is denoted by Ss and is an integer determined by first sorting the list of folders in the ascending order of the number of media files of a particular type—for example, video, picture or music—immediately contained by the folder. The size score of the folder is simply its position (starting from 1) in this sorted list. Thereby the folders with larger number of such media files in them get higher scores. The size scores of all the folders are computed in step 703.

The fourth score is the depth score of a folder. This is denoted by $S_D$ and is an integer determined by its position in the hierarchy of folders above it—its "depth number" as described in Table 9A. Folders deeper in the hierarchy are given higher scores because it can be assumed that the user has spent more effort in organizing these folders and therefore they carry more "meaning" in their structure. The depth scores of all the folders are computed in step 704.

Step 705 computes a net score S for each folder as the weighted sum of its four scores according to equation 1 below.

$$S = W_A \times S_A + W_C \times S_C + W_S \times S_S + W_D \times S_D \quad [1]$$

where $W_A$, $W_C$, $W_S$ and $W_D$ are the four weights for each type of score. The values for the four weights shown in Table 9B yield meaningful results and were determined by user trials. The numbers are provided here only for reference and an embodiment may choose to use a different set of weights than the values listed in Table 9B. It is not necessary to normalize the weights in order to derive an average because only the relative values of the net score of folders are significant in the sorting step.

In step 706, the list of folders to each of which a net score has been assigned as described above, is sorted in the descending order of the net scores. This ensures that folders that have not been used recently, have been created most recently, appear deepest in the folder hierarchy and contain the largest number of media files of a particular type, appear at the top of the final sorted list. It is most interesting to the user if files from folders of this specific nature are selected for use in the creation of the output production.

Finally, in step 707, the media files in each of the folders are shuffled into a random order. This gives equal opportunity for all the files in a particular folder to be selected for a production iteration. We now have a list of media files from which we can select a subset for use in the output production.

In another embodiment, a similar scoring scheme (without the size and depth scores) may be used to order the media files within each folder, thereby making use of the information associated with the media files—the "attributes"—to better the coherence of the selected subset of recordings. In yet another embodiment, a random score may be added to the file or folder scores before the sorting step 706 in order to increase the randomness in the file selection while maintaining some order.

This scoring and sorting procedure are be performed once for each type of media file, thereby obtaining a list of video files, a list of picture files and a list of music files. This embodiment does not log more information than listed in Table 9A, but an embodiment which does collect metadata about the media files can use an extended scoring scheme based on the said metadata to derive a list of media files with a more sophisticated order than in the simplified embodiment.

If the metadata based scores do not need any information from the user, then this step can also be absorbed into step 104 where the selected style is applied to create the output production.

Now the procedure for selecting a subset of the available media files for use as input media in this preferred embodiment is described.

Firstly, the number of video files $N_V$ that need to be selected are determined using the formula given in Equation 2 below.

$$N_V = (T \times V_0/T_0) \text{ rounded upwards} \quad [2]$$

where T is the desired output production duration in seconds, $V_0$ is the nominal number of video files required to make a production of duration $T_0$ seconds. A typical value for $V_0$ is 2 and for $T_0$ is 30 seconds. Therefore if the user desires a 1 minute long production, $N_V$ will be 4 according to Equation 2.

The required number of pictures to select, denoted by $N_P$, is similarly obtained from Equation 3 below.

$$N_P = (T \times P_0/T_0) \text{ rounded upwards} \quad [3]$$

where $P_0$ is the nominal number of pictures files required to make a production of duration $T_0$ seconds. A typical value for $P_0$ is 10. Therefore if the user desires a 1 minute production, 20 pictures need to be selected, according to Equation 3.

Now, according to step 504, $N_V$ video files and $N_P$ picture files are selected from the video and picture file lists respectively. For the very first production of a session, the video and picture files must be selected from the top of the sorted file lists resulting from step 502. For every subsequent production made with a request to change the input media files, the next $N_V$ video files and $N_P$ picture files are selected from their respective lists. Upon reaching the end of either list, the method cycles back to their beginnings and continues to select files.[SS3]

The number of music files $N_M$ selected in step 505 is such that the total media duration of the music files is at least as long as the desired output production duration. The scheme for selecting music files from the music file list given $N_M$ is the same as for selecting video and picture files given $N_V$ and $N_P$ respectively. Thus, at the end of the procedure outlined in FIG. 5, we have a set of video, picture and music files to use as input media to create the output production. Any combination of input media may be used to create the output production. For example, a production can be made purely out of picture files and music, purely with video files and music or with video files, picture files and music.

In addition to inferring grouping of media files based on folder structure information, an embodiment could let the user customize the selected media by creating additional folder structures. These folder structures in effect establish associations between a group of media files so that only the video and picture files in the same association group as a selected music file are considered for selection as part of input media. Similarly, an embodiment can select music files from the association groups of the selected video and picture files. In filing systems with support for links, the user can create a folder to represent such a group and place links to the original media files that are to be grouped inside this folder. For example, a user might wish to select "ragtime" music whenever video and pictures of her child are selected for making productions. She creates such an association by creating a new folder called "Kiddies_play_ragtime" and places links to several music files containing, for example, Joplin melodies. She further places links to all video and picture files featuring her kid inside this folder. She then selects this (or a containing) folder as one of the "root folders" as part of the production criteria of the embodiment. The very next production created by the system will select from the files referred to by the contents of the newly created folder because the contents of this folder will appear at the head of the list of score-sorted media files.

It may not always desirable to mix such a manual association scheme with the automatic scoring method. Therefore a preferred embodiment should allow the user to disable the automatic scoring part and purely use the manually created folder organizations to select from among groups of media files. If the user has specified more than one such group folder, then the embodiment can select a different group automatically each time it creates a production.

[SS4]
Style Application or "Construction"

The next general step in the method is that at 104 in FIG. 1 or applying the style. This is also referred to as construction. With input media files selected, the style can now be applied on the input data to create the output production. Typically, what is created by the process of applying the selected style is not a production itself, but merely a complete description of the production in terms of the input media—a complete independent set of instructions on how to transform the input media into the output production. Such a description is known in the field as an Edit Decision List or EDL. The IAMTimeline structure part of Microsoft's DirectShow Editing Services framework is an example of an EDL. This invention makes use of the technique of applying a style called "construction" as described in International Publication No. WO2002/052565.

For the case where applying the style results in an EDL, a subsystem known in the field as a "Renderer" is called upon to perform the instructions encoded in the EDL and edit the input media into the indicated output production by applying editing$_{[SS5]}$ steps including one or more of the following: selecting portions from the input media; re-sequencing selected portions; combining selected portions; and applying transformations to portions of the input media such as transitions and effects well known in the art.

The result of applying the transformation on the input media files, whether expressed via the medium of an EDL or not, is one of the following:

a) the results of the transformations are displayed to the user as they are being performed—in "realtime". This is the "player" mode of operation shown at step 105 in FIG. 1; or
b) the result of the transformations is encoded using video encoding technology such as Windows Media Encoder or MPEG4 and the result stored to a file on the target device or transmitted via a network connection.

The arrangement described in International Publication No. WO2002/052565 analyses one or more of the selected input media files to generate descriptors. These descriptors are then intelligently used to create a coherent production in which the visuals are appropriately synchronized to the music and respond to variations therein, the specific nature of these variations being dictated by the selected style. The process of analysis to extract descriptors for the input media files is in general very time consuming. Since the express purpose of the present embodiment is to provide instant gratification to the user, it may not be possible to quickly analyse all the selected input media files within the time limit set in step 203. Therefore one technique employed by a preferred embodiment is to perform partial analysis on the input media. Only as much of the input media will be analysed as is required to make a production of the desired output duration. For video files, only a total duration of $T \times V_0$ (meaning of terms as in Equation 2) may be analysed even though the sum of the durations of all the selected video files may far exceed this figure. Any remaining portions can be analysed when the next production is created.

Where there are even tighter constraints, such as extremely slow hardware, where even partial video analysis will cause intolerable delays for the user, video analysis is to be completely omitted and the input video files should be used without the descriptor data. One method to implement this which we disclose here is to algorithmically generate "mock descriptors" for the input video files and use them instead of the real descriptors extracted by analysis. The procedure for applying the style (or "construction") thereafter remains the same as the case where the video files are analysed in full. This is an acceptable option for handling input video files and pictures, but will not generally be satisfactory for music files because one of the key aspects of the output production that makes it visually appealing to the user is the synchronization of the edits and effects in the output to events in the music. Thankfully, analysis of music files is often fast enough to be possible to perform on even modest hardware within reasonable time constraints. Therefore in the preferred embodiment of the invention, analysis of the input music is always performed.

Using mock descriptors for input video files will occasionally cause noticeable "editing errors" such as "jump cuts" and "straddled shot boundaries". A jump cut is a sudden transition from a portion of the input video to a different portion of the input video the beginning of which is nearly, but not exactly the same as the ending of the first portion. This results in a noticeable jump in the output production. A "straddled shot boundary" is a shot boundary that occurs somewhere in the middle of a portion of input video that is used in one piece in the output production. Both these effects are aesthetically undesirable. International Publication No. WO2002/052565 discloses explicit steps to take to reduce or eliminate the occurrence of these editing errors.

The present embodiment relies on the user being a bit more forgiving of these editing errors than is assumed in International Publication No. WO2002/052565 in order to get the desired speed of production by compromising video analysis. The present embodiment retains the music analysis step which is sufficient to create engaging productions in spite of these errors.

Rendering to the Target Device

The specification of the target device in step 203 imposes constraints on the format of data that must be generated in the rendering step 105. Step 203 is either taken to directly imply the format in which the output production must be created, or is assumed to have obtained the information from the user by means of preference data.

If the target device is a computer display, a resolution of 640×480 pixels and a frame rate of 30 frames per second with RGB colour data may be appropriate. On the other hand, if the target device is a video capable portable device with a miniature display, the suitable dimensions might be 176×144 pixels and a frame rate of 10 frames per second, with the data encoded into a 3 GP file in order to conserve storage on the device. If the target device is located remotely (such as a storage) and is accessed and shared via a network such as the internet, the typical data rate at which other users will access the production will need to be taken into account in deciding the output format.

In this embodiment, it is intended to enable the fully automatic creation of stylized audio-visual productions. However, this embodiment can be extended and modified in many ways all towards the goal of automatically creating AV productions. Alternative embodiments are now described below.

Extensions to Production Criteria

The set of data provided as production criteria as described above in relation to the first embodiment can be extended to include several other types of data which further define characteristics of the output production that are important to the user. "Event information" may be specified as part of the production criteria. Examples of events are: group events such as New year, Christmas, Hanukkah, Chinese new year, Deepavali and Ramzan; group events such as company anniversaries, shopping offer seasons and happy hours in pubs; personal events such as births, birthdays, weddings, wedding anniversaries, graduation parties, party times in restaurants and places of entertainment, and so on. Typically, recurring events such as birthdays occur once every year according to some calendar. For some special groups, monthly events may also be significant, such as the day of the full moon. The members of a company, for instance, might meet once every three months. Event information is therefore expected to include a date or time interval as well as the recurrence pattern of the event if any. Event information can also be derived from the date on which the production is being made. For example, the fact that a production is being made on or close to a user's wedding anniversary can be used to infer that the user would prefer to watch productions related to his or her wedding and other anniversaries.

The term "event information" can also be used to include information about the location of occurrence of one or more events. In this sense, both "time" and "space" information are included as event information. For example, "my vacation to hawaii" may refer to the time interval for which the user was present in Hawaii, and the location information about Hawaii.

Alternative embodiments may use such event information specified as part of production criteria in the steps of selecting a style at step 102 and selecting input media files 103 as described in the sections below.

Style Selection

The term "style meta information" is used to denote data describing various characteristics of a style. Such data can often be derived from the style itself such as the average cutting speed, preferred music tempo, how responsive the style is to the dynamics in the music, etc. Such data can be supplemented by, for instance, event information which provides the contexts in which it is preferred to use the style. For example, a few styles may be created especially for use in making productions with input media recorded at weddings or wedding anniversary parties. That would then constitute the meta information for those styles. Some other styles may be created to emulate the look and feel of old film—for example, the "Classic Sepia" style referred to above in relation to the first embodiment. The meta information for such a style would then include the period (such as 1920-1930) that the style is trying to emulate.

An embodiment of the invention may associate style meta information with each style for the purpose of automatically creating context relevant productions. The automatic style selection step in such an embodiment can then be augmented with techniques to preferentially select from among the totality of styles by matching each style's meta information with relevant contextual information specified as production criteria. Styles whose meta information better match the production criteria could be given higher scores that translate into a higher probability of such styles being selected, in comparison to others whose meta information do not match as well. For instance, a set of styles may be intended for Christmas and this information would then constitute the style meta information. If the event information in the production criteria is also about Christmas, then these Christmas styles yield a match. Such event information can be derived from the date and time at which the production is made. If the date is on or shortly before or after December the 25th, it can be inferred that Christmas related productions will be better appreciated by the user. This information can then be included as part of the production criteria.

One preferred embodiment is one in which the meta information for each style specifies one or more music files that are intended for use by the style. In such a case, selecting a particular style by any method should also result in selecting one or more of the associated music files as input music for the production. This embodiment is desirable if the user is not likely to have much music on the device under consideration, such as a video-capable smart phone or PDA.

Selection of Input Media Files

Users create folders on their filing systems to organize the data as they see fit. Therefore they usually inject some order to the media files they own when they organize them into folders. In particular, they may use a recognizable naming convention for folder names such as "GrandCanyon_01_2004", "Paris_May-2004", "2003_Rome", and so on. It is highly likely then that media files under such folders relate to the events they describe and would constitute a coherent set of input media files suitable for making interesting productions. Similarly, music management software such as Apple iTunes store music files in a hierarchical fashion such as artist-album-title. In this case too the grouping under the folder implies some similarities in properties of the files. Embodiments may make use of such implied order in folder organization of media files in order to select groups of media files for use in making productions.

In other embodiments, the method for selecting input media files described in the preferred embodiment can be extended to include information other than just folder information available with the file system. The score-based selection mechanism can be extended in the following manner to include such additional information. For example, event information may be available that indicates that a wedding anniversary production, birthday production or Christmas production is desired. The production criteria can be matched against the metadata available for each media file in order to derive a score for each file such that higher values of the score indicate greater desirability of the media. Such a score can be combined with other scores such as those in FIG. 7. to get a net score for each media file in a step similar to 705. Sorting the available media files in the descending order of the net score thus computed will yield a list of media files where the most desirable media files will appear near the head of the list. A subset of media files can then be selected as input media files from this list starting from the head.

Kinds of metadata associated with music files that are interesting for the purpose of input music selection include the following a) Period of the music, such as 1950's jazz. If the meta information of the selected style indicates that it is trying to emulate the 1950's television look, then music files whose metadata indicates the 1950s can be given higher scores than those that have evolved more recently.

b) Tempo of the music. This might be obtained by analyzing the music file using digital signal processing techniques, or from imported descriptors such as the MIDI file that was created as part of the music creation process. Style meta information may indicate preference for a fast tempo of, say, 150 beats per minute. This can be matched against the music tempo (extracted or imported) to give preference to fast paced music in the file selection step.

c) "Drive" of the music. An approximation to the drive of a piece of music can be derived using signal processing techniques during the analysis step. Typical indicators for the "drive" are loudness, intensity of spectral variations and spectral width of the sounds in the music. An embodiment can then use such a drive level included in style meta information to select music files with appropriate drive as extracted by analysis. If a style's meta information indicates a preference for high drive music, then music files with higher average drive descriptor values can be given higher scores so that they are preferred over others that don't have the desired drive levels.

d) The time at which it is most appropriate to use the music file. For example, A set of music files might be marked as "Christmas carols". This information may also be available as part of the "genre" descriptor available in the ID3 tags of typical MP3 encoded music files. Production criteria may indicate that the user desires to make productions for Christmas. Such information can be inferred if the user is using the embodiment on or shortly before or after December the 25th of any year. Christmas carols can then be given higher scores than files containing Tibetan chants, for instance.

e) File system information such as creation date and last use date. If the user has just transferred a set of music files on to the filing system or played a set of files recently before using the embodiment to make an AV production, it is likely that the user would want these recent music files to be used to make the production. These files can then be scored higher based on how recently they were created or use time stamps.

f) The geographical location to which the kind of music in the file belongs. The geographical location can sometimes be inferred from the genre. For example, if a music file contains Kabuki music, then the relevant geographical location is the region of Japan. If the user has recently transferred video and pictures from a Japan vacation trip and this information is available as part of production criteria, then an embodiment can give the music files which can be inferred to location match Japan higher scores than others which do not.

g) Rating information set as part of an external application or device such as a music player. Files rated higher by the user should typically be assigned higher scores for input music selection.

h) Usage statistics such as the number of times a particular file used. An embodiment can drive the user to explore files in his or her music collection that are rarely listened to by giving lower scores to files that have been listened to more often and higher scores to files that have hardly or never been listened to.

Similarly, metadata associated with video files that are interesting for the purpose of video and picture file selection include the following.

a) Patterns in the naming of a file or a group of files. An embodiment can choose to treat a set of video or picture files with similar file names as a group when selecting input media files. Usually, similar names given by the user indicate that the files have some association between them. String comparison methods well known in the art can be used to detect such file groupings.

b) File system information such as creation date and last use date. Use of the creation date and the last use date is covered in the description of the preferred embodiment.

c) Availability information. A set of files can become available to an embodiment by the result of an action by the user. For example, the user may "dock" a PDA to a computer executing an embodiment, thereby making all the files stored on the PDA accessible to the embodiment. The time at which the PDA has been made available to the embodiment for use in productions can then be used to influence the selection of input media files by appropriately adding scores to the files made available. For example, docking a PDA with video and picture files can be interpreted to mean that the newly available files must now be used to make productions. An embodiment can then automatically include the media files just made available in subsequent productions.

d) The date and time at which the media file's contents were captured by a recording device. The recording time stamp of video and picture files can be used simply to select the latest recordings—in lieu of the creation time stamp obtained from the file system. Alternatively, they can be used in a more sophisticated way. It can be inferred as part of setting production criteria that if the production is being made on the user's wedding anniversary, then it is likely that the user would prefer that video shot during his or her wedding anniversaries are used in the production. The capture time stamps of video and picture files can be used to give files captured on the user's wedding anniversaries higher scores than other files, so that they get selected first.

e) The geographical location where the video or picture file was recorded. This information might be available from GPS instrumentation that may be part of the camera apparatus that captured the media and can subsequently be imported for use in the input media selection step. Geographical information available as part of production criteria or as part of style meta information can be used to give media files with matching location descriptors higher scores than those that don't. For example, if the user has selected a "Tea ceremony" style that has style meta information declaring it related to Japan, then media files with imported location descriptors that match the coordinate region of Japan can be given higher scores for input media selection than other media files.

f) The device on which the media was captured and the format of the media. An embodiment can use the target device information specified as part of production criteria to give higher scores to those video and picture files which were either captured on devices that match the target device or have a format (resolution, frame rate, data rate, etc.) that is suitable for the target device. This ensures, for example, that relatively poor quality video material captured on a camera phone is not used to create a HDTV (High Definition TeleVision) quality production for which high resolution and high frame rate input media would be most appropriate. Additionally, the format information can also be used to select a group of files with similar formats. This will ensure that low resolution input media is not mixed with high resolution media in the output production since that will be unacceptable for aesthetic reasons. If so desired, the user can be presented with an interface to select a combination of format and quality information, which can be used in an appropriate embodiment to select suitable input media files.

f) Usage statistics such as the number of times a media file was used to make productions. Such statistics can be highly multidimensional. For example, the usage count can be collected on a per-style basis. Usage counts can be used to assign lower scores to media files that have been used more than others. This ensures that the user doesn't keep seeing the same material over and over again in the created productions.

In general, the steps of:

a) deriving a score for each media file and folder from any new information available as production criteria or style meta information;
b) including the score in the computation of the net score in a step similar to 706; and
c) ordering the list of media files and folders in descending order of their net scores (similar to 707)

constitute a method to incorporate such production criteria during input media selection at 103. If media descriptors are available as a result of extensive media logging in step 501, they can also be used to influence the selection of input media files by extending the scoring scheme in the manner described above.

It is also possible in an embodiment to select a set of media files using information obtained in the media logging step and some other techniques known in the art. These techniques include the following.

a) Multi-dimensional clustering: In a typical clustering scheme, the descriptors are organized into a multi-dimensional space with an established distance measure between any two points in the space. Each media file is then represented by a point in this space. Clusters are determined by grouping together points that are close to each other according to the distance measure. Files which are determined to constitute a cluster are selected in groups and files determined to be "far away" from each other are not used together in a single production. An example of a multi-dimensional descriptor space is a three-dimensional space where one coordinate is the recording date and the other two coordinates are the latitude and longitude of the geographical position of the recording event. Clustering in this three-dimensional space will yield files that relate to significant recorded events. Techniques for clustering such as vector quantization are well known in the art.

b) Sorting: Simple sorting techniques for sorting media files according to, for example, the alphabetical order of the file names can yield groups of related files. For example, Canon still cameras name the pictures they capture with a "DSC" prefix followed by a digit sequence. Therefore photos shot on the Canon camera will clump together in the sorting operation. Embodiments can sort according to time stamps, zoom factors, etc. to get other orderings of the media files.

c) Feedback: The results of each media file selection step can be summarized and fed back as input to selection steps for subsequent productions.

d) Search algorithms: The information collected in the media logging step can be considered to be a "database" according to conventional information processing terminology. One of several possible database searching operations can be used in an embodiment to select a subset of media files from the totality of available media files. It is most desirable if the search criterion can be automatically determined or else specified by the user as part of a set of preferences included as part of production criteria. It is best if the user is not asked to set such search criteria repeatedly for each production. Means to specify and methods to perform such searches are well known to those skilled in database technology.

Variations in Analysis of Media Files

Alternative embodiments of the system are envisaged in order to tackle the problem of the time consuming nature of analyzing media files to extract descriptors using signal processing techniques.

One alternative embodiment can selectively analyze files by first estimating the time it will take to analyze a given media file on a given hardware. Such an estimate can be arrived at by using the speed with which the analysis is known to progress on the given hardware. A preferred way to estimate analysis time is to extrapolate from a measurement of the time it takes to analyze a small portion of the file. The embodiment can choose not to analyze the file if it is determined that it will take unacceptably long to analyze it and choose to create mock descriptors instead.

In an embodiment that estimates analysis times for media files, it is desirable that for the very first production of a session only those media files are used for which analysis can be performed in the least possible time. For subsequent productions, media files that take longer to analyze can be accommodated.

An embodiment can include partial analysis of media files so that the analysis operation can be completed within a time set as part of production criteria. The possibility and usefulness of such a partial analysis can be determined by prior estimation. The partial analysis results can subsequently be completed over a few productions.

Yet another embodiment may implement a background analysis method where analysis of media files happens in the background while productions are being created in the foreground. This usually requires relatively fast hardware that supports such multi-tasking, but is useful to perform if possible. Eventually, all the available media files will be analyzed and a rich set of descriptors will be available for use in input media selection and creation of the productions. The background analysis can be continued even after production has been stopped by the user. A preferable implementation of background analysis is one whereby the rate at which the background analysis is performed is varied according to the availability of processor time. That is, background analysis will be performed at full processor speed once the user has stopped using the device and will slow down to accommodate any other task that the user may be performing. By this method, the user will feel that the computer or portable device is responsive at all times. Most operating systems such as Microsoft Windows and various UNIXes provide ways to detect idle time of the processor, which can be used in the implementation of the said embodiment.

Methods with Reordered Steps

In another alternative embodiment, it is envisaged that at least certain of the steps of the first embodiment described above be re-ordered. Specifically, exchanging the steps of style selection 102 and input media selection 103 will yield an embodiment that does not differ significantly from the preferred embodiment in terms of function. The only aspects of the method that are altered are for those extensions wherein information about the selected style is used in the selection input media files.

In an embodiment in which the steps 102 and 103 are reversed, the selected style cannot influence the input media selection step any more. However, it is now possible to use metadata of the selected input media files to give preference to a set of styles in the style selection step. For example, if all the capture dates of the selected input media happen to fall near Christmas, then this fact can be used to select styles intended for use during the Christmas season. As another example, the descriptors of the selected input media files can be used to determine whether there are many human faces in them. If so, styles which highlight human faces can be selected preferentially over those that don't.

Continuous Player Embodiment

Figure 8:
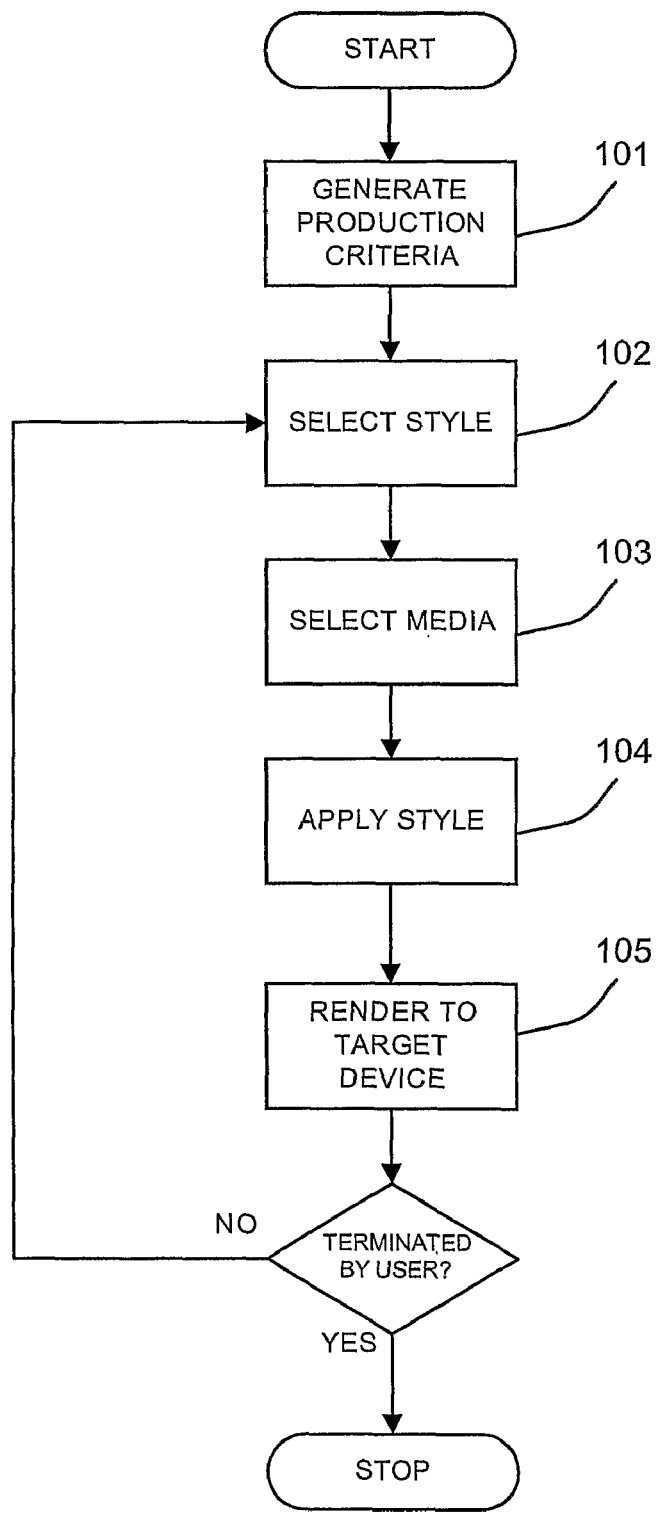
FIG. 8 shows an alternative form of the method shown in FIGS. 1 to 7 and that constitutes a second embodiment of this invention.

In another embodiment, the step 105 of rendering the output production to the target can be followed by automatically restarting the whole method again to create a new production, unless terminated by the user. Such a method enables the creation of a "stylized video player" that can function without any user intervention and illustrated in FIG. 8. FIG. 8 describes the looping back as taking place to the step of style selection at 102. That is not always necessary and all the embodiments in which the loop back occurs to any of the steps 102, 103, 104 are useful and interesting. Yet another embodiment can also take instruction from the user, in the form of a preference, on the step to which the method must be restarted in each iteration. Looping back to 102 may result in a different style being used every time a production is created. Looping back to 103 will cause the same style to be used, but different media files may be selected for each production. Looping back to 104 will neither change the style nor change the input media, but will simply create a different production using the same style and input media as determined in the first iteration. In this case, randomness in implementation of step 104 may be used to inject some variety into the series of output productions.

In some extreme cases, it may be useful to loop back the continuous player to the step 101 for setting production criteria. For example, if an embodiment is capable of determining whether a user likes a particular production, this information can be used to fine tune the previously set production criteria in order to generate more productions that are in tune to the user's liking.

The possibility of looping back to step 105 is least appealing as it will result in the same production being rendered again and again. Looping back to 104 is preferable to this. Yet another continuous player embodiment may interchange the steps 102 and 103 as described above in relation to the alternative embodiment with certain re-ordered steps. One application of the continuous player embodiments is for use in a "multimedia kiosk" or a living room device such as gaming consoles, media players, multimedia storage devices, computers such as those based on Windows Media Center Edition operating system. Such a kiosk runs for extended periods of time unattended. Therefore it will make it interesting to the user or passers by if the kiosk continuously creates interesting AV productions and plays them on its display. Attracted users can then add their own media files into the mix if they wish to do so. The embodiment used in the kiosk may also dynamically change the loop back scheme. For example, the kiosk may be configured to change the input media selection once for every 5 productions or when a user adds new media and change the style once for every 12 productions.

Such a kiosk may also derive rating information for a style based on, for instance, how frequently users are attracted to the kiosk when a production in that style is playing. This rating information can then be used to influence the style selection step 102. All these variations make use of the primary sequence of steps shown in FIG. 1. (or with steps 102 and 103 interchanged) in order to create AV productions.

For an embodiment engaging in continuous production, it is desirable to introduce some random variations from one production to the next. One such variation is alternately increasing and decreasing the relative volume level of the sync sound of the input video (the sound recorded along with the video) with respect to that of the music file in creating the sound track of the production. Another kind of variation is the sequence in which the selected input media files are used in the production. They may be used in the sequence of their capture times for one production and in the next they can be shuffled around with the pictures.

A continuous player embodiment can be configured by a user for being presented as a "screen saver". In such a case, the process of creating AV productions for full screen display is started every time the display of the user's computer or portable device such as camera phone or PDA, is set to idle. In such a case, the embodiment will preferably play only the selected music without mixing in any sync-sound associated with the video. Also, the volume of the played music would be set low enough or to mute so that it would not affect other people who might be sharing the environment.

Variations in the Rendering Step

In the preferred embodiment, the target device specified in step 203 is used to infer the output format of the rendering step 105. However, all the input media files that have been used in the production could have been imported from a connected device such as PDA or camera phone. In such a case, it is desirable for an embodiment to adjust the output format to match the quality level at which all input media files can be acceptably viewed. For example, if the input video files consist of video files with sizes 176×144 as well as 160×120, the output format can be set to 176×144.

In another embodiment, the input media selection step can aid in ensuring that the output production does not use material with widely varying playback quality by selecting only files with similar playback qualities.

For the case where the user has connected a device such as a PDA or camera phone by docking and media files on the connected device have been used to make a production, an embodiment may automatically infer the target device to be the connected device and transfer the productions to its storage with little or no user indication.

Streaming Input Video

Input media to an embodiment may be presented as a stream of digital video data. Such a stream can come from a source such as a television broadcast and can be analyzed in real time if possible. In this case, instead of searching for video files, an embodiment can search the incoming video stream for portions that match the production criteria. The found media can subsequently be used to create productions according to the rest of the steps of the invention.

For example, the user might have indicated a preference for nature shows as part of the production criteria and provided a television broadcast stream. In conjunction with show timings for the broadcast stream (possibly available from an external source such as one on the internet), it is then possible to derive the times of portions of the incoming video stream that the user is likely to be interested in. The incoming stream can then be stored at these determined times and the stored video files can be used to create productions that summarize the contents to the user in an appealing manner at a time convenient to the user.

Embedding in Music Players

An embodiment of the method may be embedded in the context of a music player application such as iTunes™ and Windows Media Player™. The player can also be part of a portable device such as a smart phone. This embodiment can use information about the currently playing music file in order to automatically perform the steps of selecting a style, selecting input media files and applying the style to automatically create interesting productions appropriate for the music selected by the user for playback. Such productions would be highly personal to the user since the user's own video and pictures will be made use of in the shown productions in a highly stylized manner. Such a music player focused embodiment may be presented as a stand-alone application or as a "visualizer plugin" for other music player applications.

Figure 10:
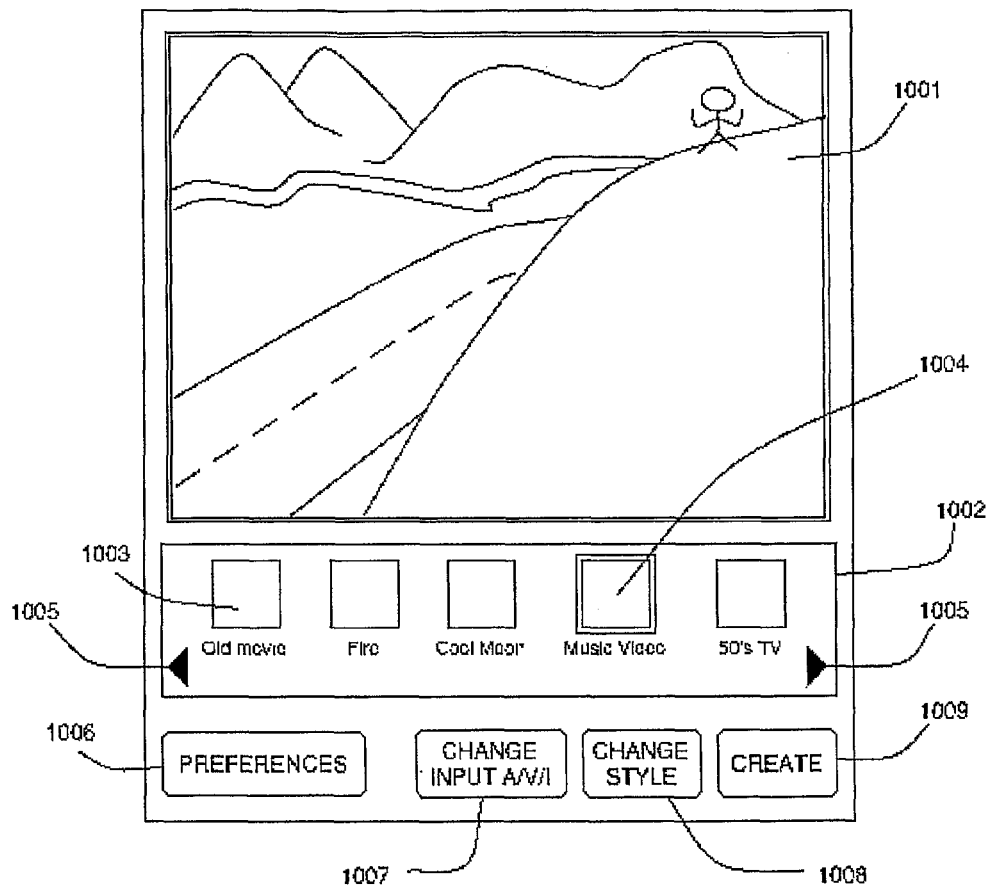
FIG. 10 is a schematic illustration showing a graphical user interface employed in embodying this invention.
Figure 11:
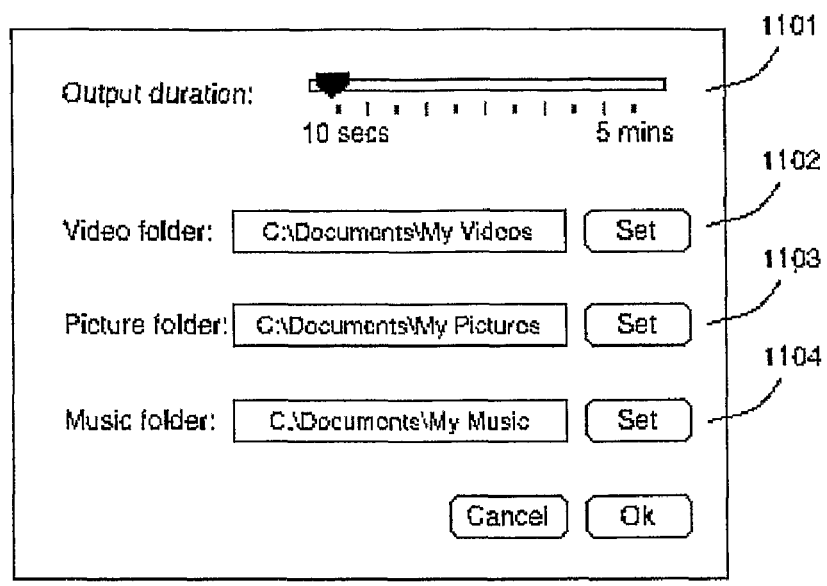
FIG. 11 shown an example of a graphical user interface for use in setting production criteria.

The appearance and behaviour of one preferred form of a graphical user interface as implemented by a computer and for use as a user interface for the methods that embody this invention and described above is shown in FIGS. 10 and 11 and now described. It is to be emphasized that the interface of FIGS. 10 and 11 is only to illustrate how a user might use an embodiment of this invention. A person skilled in the art can implement a variety of interfaces to a system which implements an embodiment of this invention. 1001 is a means to display the output production to the user. After the completion of step 105, the output production will, in a preferred embodiment, begin playing automatically in this display area. While a production is being played, an embodiment may create another production in the background which will then begin playing as soon as the currently playing production completes.

FIG. 10 shows at 1006 a means for the user to specify production criteria. In a preferred embodiment, all the production criteria would have default values and the user is not forced to set them explicitly. By pressing this button, the user is taken temporarily to another interface such as shown in FIG. 11 for this purpose. In the interface of FIG. 11, the user is provided with means 1101 to set the output duration and the video 1102, picture 1103 and music 1104 folders from which media files of the respective types are to be selected. The other production criteria such as the target device and maximum execution time are assumed to be implicit for the embodiment with this interface.

The interface includes at 1002 a means to present the list of available styles such as 1003 and 1004 to the user. In the illustration, each style in the area 1002 is represented by both a small image—the "style icon"—shown as a rectangle in 1003 and 1004, as well as the style name. In a preferred embodiment, the user is allowed to override the automatically selected style. In such a case, the user will use this means to specify which style to use in the next production. In the example shown in FIG. 10, 1004 is the currently selected style, since it is highlighted when compared to the other styles. The buttons 1005 are intended for the user to "scroll" to view the other available styles if the number of style available exceeds the number that can be displayed in the finite display area available for the part of the interface shown at 1002.

The buttons 1007, 1008 and 1009 are provided as means for the user to initiate the creation of a production different from the one currently playing. 1009 is used to start the creation of another production without changing either the input media selection or the currently selected style. 1007 is used to start the creation of another production in which the input media selection step 103 is performed again, without changing the currently selected style. 1008 is used to start the creation of another production by changing the currently selected style according to one of the several discussed methods of automatic style selection in step 102, without changing the input media selection.

The invention claimed is:

1. A method of automatically editing at least visual media recordings to produce a media production using computer processing means, the method including the steps of:
   a) setting production criteria, the production criteria including criteria indicative of at least one of: a location in which a collection of discrete media recordings, including at least discrete visual media recordings, is stored so as to be accessible by the computer processing means and from which recordings are to be selected, a preferred duration of the media production, and the type of device on which the media production is to be played;
   b) automatically selecting ones of the discrete media recordings, including at least ones of the discrete visual media recordings, from the or another collection thereof based on attributes of the recordings and attributes of groups of the recordings;
   c) producing editing instructions indicative of how the selected recordings are to be operated on by the or other computer processing means to produce a media production that satisfies the production criteria;
   wherein each said group of recordings is located together in a folder or directory organized under a computer filing system, and wherein the attributes of each such group of recordings indicate when the folder or directory containing the group was accessed, created, modified; and/or indicate the level of that folder or directory in a hierarchy of such folders and/or directories; and/or indicate the title of the folder or directory containing the recordings in that group.

2. A method according to claim 1, wherein the collection of discrete media recordings includes discrete audio recordings and step (b) includes selecting ones thereof based on attributes of the recordings or of groups of the recordings.

3. A method according to claim 1, wherein the production criteria in step (a) includes specifying at least one website at which at least part of the collection of media recordings is located.

4. A method according to claim 1, wherein the at least some of media recordings are files organized under a computer operating system and wherein the attributes include pre-existing information normally assigned by the operating system to such files or to a folder or directory in which the files are stored.

5. A method according to claim 1, wherein the method includes the step of assigning one or more attributes to one or more of the discrete media recordings in the collection and the step of analyzing one or more media recordings in order to generate content information indicative of the content of at least part of that recording, the content information then being assigned to the respective recording as an attribute for use in the selecting of step (b).

6. A method according to claim 1, wherein the method includes the step of setting style information that determines the editing instructions and hence the way in which the selected media recordings are operated on in step (c) so as to determine the way in which the selected media recordings are presented when the production is played back.

7. A method according to claim 6, wherein the step of setting the style information precedes step (b) and the style information at least partly determines the media recordings that are selected in step (b).

8. A method according to claim 6, wherein the step of setting the style information follows step (b) and the style information is at least partly determined by the media recordings that are selected in step (b).

9. A method according to claim 6, wherein the style information is determined automatically at least partly based on the time and/or date of initiating one or more steps of the method.

10. A method according to claim 1, wherein step (c) is followed by the step of the computer processing means carrying out the instructions produced in step (c) so as to produce the media production in realtime and, optionally, wherein not all of the instructions are carried out, or wherein the instructions are produced, or wherein the instructions are carried out, in such a way that the production can be played in realtime.

11. A method according to claim 1, wherein the method includes the step of the computer processing means automatically downloading media recordings from an external target device in communication therewith to store those recordings on local storage means accessible by the computer processing means.

12. A method according to claim 11, wherein the automatic downloading and/or transmitting takes place automatically upon the computer processing means and the device being brought into communication with one another.

13. A method according to claim 1, wherein the method includes the step of the computer processing means automatically transmitting information indicative of the media production to an external target devices such that the media production can be played thereon.

14. A method according to claim 1 such that it is repeatedly performed by the computer processing means and is interruptible by user intervention.

15. A method according to claim 1, wherein each recording has attributes associated therewith indicating at least one of: the time of recording, the geographical location of recording, the subject of the recording, the title of the recording, the time the recording was last accessed by a user, and the frequency of access by the use and/or wherein groups of recordings each have attributes associated therewith indicating when one or more of the recordings in that group was accessed, recorded and/or modified, and/or indicating the subject and/or title of one or more of the recordings in that group.

16. A method according to claim 1, wherein step (b) includes selecting ones of the discrete media recordings in the collection, or groups thereof, on the basis that each recording or group has a respective and corresponding attribute that includes common information and/or wherein the common information includes at least one of: a number, word, part of a word, and a plurality of words and/or wherein the common information is contained in a title of the recording or group.

17. A method according to claim 1, wherein one or more of the media recordings are stored in one or more directories or folders in a filing system organized under a computer operating system and wherein each discrete media recording is a respective file in such a directory or folder.

18. A method according to claim 17, wherein the production criteria set in step (a) includes specifying at least one directory or folder, the contents of which are to constitute the collection.

19. A method according to claim 1, wherein the production criteria set in step (a) includes a criterion indicative of the time that should be spent in carrying out the method or in carrying out one or more of the steps thereof.

20. A method according to claim 1, wherein step (a) includes setting a production criterion indicative of a supply of media recordings information from which information indicative or one or more media recordings is supplied and wherein the method includes the step of analyzing some or all of the supply of media recordings as the or each supply is received, including analyzing one or more media streams in real time and, optionally, wherein the method carries out the subsequent steps thereof to produce also and/or play the production in real time.

21. A method according to claim 1, wherein the method is such that the production can be produced with no input from the user, save as to initiate the running of the method, the method automatically performing the subsequent steps.

22. A method according to claim 1, wherein the method is such that the media production can be produced by the input of one or two or three separate instructions by a user and wherein the instruction is, or the instructions include, specifying the production criterion or criteria; specifying the attribute or attributes on which the selection is to be based; or selecting the style.

23. A method according to claim 1, wherein the attributes for one or more recording(s) include information assigned to that or those recordings by a user.

24. A method of automatically editing at least visual media recordings to produce a media production using computer processing means, the method including the steps of:
 a) setting production criteria, the production criteria including criteria indicative of at least one of: a location in which a collection of discrete media recordings, including at least discrete visual media recordings, is stored so as to be accessible by the computer processing means and from which recordings are to be selected, a preferred duration of the media production, and the type of device on which the media production is to be played;
 b) automatically selecting ones of the discrete media recordings, including at least ones of the discrete visual media recordings, from the or another collection thereof based on attributes of the recordings or of groups of the recordings;
 c) producing editing instructions indicative of how the selected recordings are to be operated on by the or other computer processing means to produce a media production that satisfies the production criteria;
 wherein the location includes a reference to one or more media recordings that are stored elsewhere, but accessible by the computer processing means, and that or those recordings are considered as if they were in the location, and, optionally, wherein the references are in the form of a playlist.

25. A method according to claim 24, wherein the collection of discrete media recordings includes discrete audio recordings and step (b) includes selecting ones thereof based on attributes of the recordings or of groups of the recordings.

26. A method according to claim 24, wherein the method includes the step of setting style information that determines the editing instructions and hence the way in which the selected media recordings are operated on in step (c) so as to determine the way in which the selected media recordings are presented when the production is played back.

27. A method according to claim 24, wherein step (c) is followed by the step of the computer processing means carrying out the instructions produced in step (c) so as to produce the media production in realtime and, optionally, wherein not all of the instructions are carried out, or wherein the instructions are produced, or wherein the instructions are carried out, in such a way that the production can be played in realtime.

28. A method according to claim 24, wherein the method includes the step of the computer processing means automatically transmitting information indicative of the media production to an external target devices such that the media production can be played thereon.

29. A method according to claim 24, wherein each recording has attributes associated therewith indicating at least one of: the time of recording, the geographical location of recording, the subject of the recording, the title of the recording, the time the recording was last accessed by a user, and the frequency of access by the use and/or wherein groups of recordings each have attributes associated therewith indicating when one or more of the recordings in that group was accessed, recorded and/or modified, and/or indicating the subject and/or title of one or more of the recordings in that group.

30. A method according to claim 24, wherein the method is such that the media production can be produced by the input of one or two or three separate instructions by a user and wherein the instruction is, or the instructions include, specifying the production criterion or criteria; specifying the attribute or attributes on which the selection is to be based; or selecting the style.

31. A method of automatically editing at least visual media recordings to produce a media production using computer processing means, the method including the steps of:
   a) setting production criteria, the production criteria including criteria indicative of at least one of: a location in which a collection of discrete media recordings, including at least discrete visual media recordings, is stored so as to be accessible by the computer processing means and from which recordings are to be selected, a preferred duration of the media production, and the type of device on which the media production is to be played;
   b) automatically selecting ones of the discrete media recordings, including at least ones of the discrete visual media recordings, from the or another collection thereof based on attributes of the recordings or of groups of the recordings;
   c) producing editing instructions indicative of how the selected recordings are to be operated on by the or other computer processing means to produce a media production that satisfies the production criteria;
   wherein the method includes the step of generating an estimate of how long it would take to analyze one or more of the media recordings so as to produce content information therefor, and optionally includes including information indicative of this estimated analysis time in an attribute assigned to the or each respective recording, the method further optionally including the subsequent step of using the information indicative of the estimated analysis time in step (b) to select media recordings that can be analyzed in a time specified in the production criteria of step (a).

32. A method according to claim 31, wherein the production criteria in step (a) includes specifying at least one website at which at least part of the collection of media recordings is located.

33. A method according to claim 31, wherein the method includes the step of setting style information that determines the editing instructions and hence the way in which the selected media recordings are operated on in step (c) so as to determine the way in which the selected media recordings are presented when the production is played back.

34. A method according to claim 31, wherein step (c) is followed by the step of the computer processing means carrying out the instructions produced in step (c) so as to produce the media production in realtime and, optionally, wherein not all of the instructions are carried out, or wherein the instructions are produced, or wherein the instructions are carried out, in such a way that the production can be played in realtime.

35. A method according to claim 31, wherein each recording has attributes associated therewith indicating at least one of: the time of recording, the geographical location of recording, the subject of the recording, the title of the recording, the time the recording was last accessed by a user, and the frequency of access by the use and/or wherein groups of recordings each have attributes associated therewith indicating when one or more of the recordings in that group was accessed, recorded and/or modified, and/or indicating the subject and/or title of one or more of the recordings in that group.

36. A method according to claim 31, wherein step (b) includes selecting ones of the discrete media recordings in the collection, or groups thereof, on the basis that each recording or group has a respective and corresponding attribute that includes common information and/or wherein the common information includes at least one of: a number, word, part of a word, and a plurality of words and/or wherein the common information is contained in a title of the recording or group.

37. A method according to claim 31, wherein the production criteria set in step (a) includes a criterion indicative of the time that should be spent in carrying out the method or in carrying out one or more of the steps thereof.

38. A method according to claim 31, wherein step (a) includes setting a production criterion indicative of a supply of media recordings information from which information indicative or one or more media recordings is supplied and wherein the method includes the step of analyzing some or all of the supply of media recordings as the or each supply is received, including analyzing one or more media streams in real time and, optionally, wherein the method carries out the subsequent steps thereof to produce also and/or play the production in real time.

39. A method according to claim 31, wherein the method is such that the media production can be produced by the input of one or two or three separate instructions by a user and wherein the instruction is, or the instructions include, specifying the production criterion or criteria; specifying the attribute or attributes on which the selection is to be based; or selecting the style.

40. A method of automatically editing at least visual media recordings to produce a media production using computer processing means, the method including the steps of:
   a) setting production criteria, the production criteria including criteria indicative of at least one of: a location in which a collection of discrete media recordings, including at least discrete visual media recordings, is stored so as to be accessible by the computer processing means and from which recordings are to be selected, a preferred duration of the media production, and the type of device on which the media production is to be played;
   b) automatically selecting ones of the discrete media recordings, including at least ones of the discrete visual media recordings, from the or another collection thereof based on attributes of the recordings or of groups of the recordings;
   c) producing editing instructions indicative of how the selected recordings are to be operated on by the or other computer processing means to produce a media production that satisfies the production criteria;
   wherein the method includes the step of recording that one or more media recordings has or have been selected in one iteration of the method, such that it or they can be omitted from the or a subsequent iteration of the method, and, optionally, wherein the method keeps count of the number of times that one or more of the media recordings is or are selected, such that it progressively tends not to select those recordings as their count increases.

41. A method according to claim 40, wherein the collection of discrete media recordings includes discrete audio recordings and step (b) includes selecting ones thereof based on attributes of the recordings or of groups of the recordings.

42. A method according to claim 40, wherein the production criteria in step (a) includes specifying at least one website at which at least part of the collection of media recordings is located.

43. A method according to claim 40, wherein the method includes the step of setting style information that determines the editing instructions and hence the way in which the selected media recordings are operated on in step (c) so as to determine the way in which the selected media recordings are presented when the production is played back.

44. A method according to claim 40, wherein step (c) is followed by the step of the computer processing means carrying out the instructions produced in step (c) so as to produce the media production in realtime and, optionally, wherein not all of the instructions are carried out, or wherein the instructions are produced, or wherein the instructions are carried out, in such a way that the production can be played in realtime.

45. A method according to claim 40, wherein the method includes the step of the computer processing means automatically transmitting information indicative of the media production to an external target devices such that the media production can be played thereon.

46. A method according to claim 40, wherein each recording has attributes associated therewith indicating at least one of: the time of recording, the geographical location of recording, the subject of the recording, the title of the recording, the time the recording was last accessed by a user, and the frequency of access by the use and/or wherein groups of recordings each have attributes associated therewith indicating when one or more of the recordings in that group was accessed, recorded and/or modified, and/or indicating the subject and/or title of one or more of the recordings in that group.

47. A method according to claim 40, wherein the production criteria set in step (a) includes a criterion indicative of the time that should be spent in carrying out the method or in carrying out one or more of the steps thereof.

48. A method according to claim 40, wherein step (a) includes setting a production criterion indicative of a supply of media recordings information from which information indicative or one or more media recordings is supplied and wherein the method includes the step of analyzing some or all of the supply of media recordings as the or each supply is received, including analyzing one or more media streams in real time and, optionally, wherein the method carries out the subsequent steps thereof to produce also and/or play the production in real time.

49. A method according to claim 40, wherein the method is such that the media production can be produced by the input of one or two or three separate instructions by a user and wherein the instruction is, or the instructions include, specifying the production criterion or criteria; specifying the attribute or attributes on which the selection is to be based; or selecting the style.

50. Computer processing apparatus comprising:
a processor; and
a memory device having a computer program recorded therein including code portions which when executed by the processor cause the processor to automatically edit at least visual media recordings based on production criteria to produce a media production, the production criteria including criteria indicative of at least one of:
a location in which a collection of discrete media recordings, including at least discrete visual media recordings, is stored so as to be accessible by the computer processor and from which recordings are to be selected, a preferred duration of the media production, and the type of device on which the media production is to be played;
the code portions being adapted, when executed by the processor, to cause the processor to perform said automatic editing by:
a) automatically selecting ones of the discrete media recordings, including at least ones of the discrete visual media recordings, from the or another collection thereof based on attributes of the recordings and attributes of groups of the recordings;
b) producing editing instructions indicative of how the selected recordings are to be operated on by the or another processor to produce a media production that satisfies the production criteria;
wherein each said group of recordings is located together in a folder or directory organized under a computer filing system, and wherein the attributes of each such group of recordings indicate when the folder or directory containing the group was accessed, created, modified; and/or indicate the level of that folder or directory in a hierarchy of such folders and/or directories;
and/or indicate the title of the folder or directory containing the recordings in that group.

* * * * *